United States Patent
Takahashi

(10) Patent No.: US 8,693,026 B2
(45) Date of Patent: Apr. 8, 2014

(54) PRINTING SYSTEM, APPARATUS AND CONTROL METHOD THEREFOR, STORAGE MEDIUM AND PROGRAM

(75) Inventor: Toru Takahashi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1247 days.

(21) Appl. No.: 12/099,878

(22) Filed: Apr. 9, 2008

(65) Prior Publication Data

US 2008/0259389 A1  Oct. 23, 2008

(30) Foreign Application Priority Data

Apr. 20, 2007 (JP) ................................ 2007-112300

(51) Int. Cl.
*G06F 3/12* (2006.01)
(52) U.S. Cl.
USPC .................... 358/1.15; 358/1.13; 358/1.14
(58) Field of Classification Search
USPC ............. 358/1.12, 1.13, 1.14, 1.15, 1.18, 1.9, 358/1.3, 1.4, 1.16, 401, 403; 399/2, 77, 81, 399/82
See application file for complete search history.

(56) References Cited

U.S. PATENT DOCUMENTS

| 6,512,899 | B2 | 1/2003 | Shimada |
| 6,896,426 | B2* | 5/2005 | Nakagiri ........................ 400/76 |
| 7,864,346 | B2* | 1/2011 | Ryan et al. ................... 358/1.12 |
| 2005/0068561 | A1* | 3/2005 | Tonegawa ................... 358/1.13 |
| 2005/0128500 | A1* | 6/2005 | Nakagiri ....................... 358/1.9 |
| 2005/0157330 | A1* | 7/2005 | Giuliano ..................... 358/1.15 |
| 2007/0057426 | A1 | 3/2007 | Tao et al. |

FOREIGN PATENT DOCUMENTS

| CN | 1932664 A | 3/2007 |
| JP | 2005-208688 A | 8/2005 |
| JP | 2006-191334 A | 7/2006 |
| JP | 2001-309116 A | 11/2011 |

OTHER PUBLICATIONS

Dec. 18, 2009 Chinese Office, Action which is enclosed with English Translation, that issued in Chinese Patent Application No. 200810092936.6.
Jun. 11, 2012 Japanese Office Action, which is enclosed without an English Translation, that issued in Japanese Patent Application No. 2007-112300.
Feb. 15, 2013 Japanese Office Action, which is enclosed without English Translation, that issued in Japanese Patent Application No. 2007-112300.

* cited by examiner

*Primary Examiner* — Vu B Hang
(74) *Attorney, Agent, or Firm* — Cowan, Liebowitz & Latman, P.C.

(57) ABSTRACT

A printing apparatus capable of, when a predetermined finishing process is set in performing job combination, executing the finishing process at consistent settings by properly performing an inhibition process corresponding to the finishing process. When a predetermined finishing process is set as an entire setting of job combination, the system inhibits excluding, from targets of the predetermined finishing process, a predetermined job corresponding to the predetermined finishing process among a plurality of jobs associated with job combination.

16 Claims, 31 Drawing Sheets

FIG. 16

| | TYPE | DOCUMENT NAME | PAPER SIZE | PAGE | DATE/TIME |
|---|---|---|---|---|---|
| | | 20060523160315 | A4 | 1 | 05/23 16:03 |
| | | 20060602095639 | A4 | 1 | 06/02 09:56 |
| | | 20061102204300 | | 3 | 11/02 20:43 |
| 1 | | 20061102204325 | | 2 | 11/02 20:43 |
| | | 20061102204347 | | 2 | 11/02 20:43 |

USER BOX  00 : DEPARTMENT 1  00 : TOTAL 5

1611 — ◀ 1/1 ▶

1610

1612 — CANCEL SELECTION
1613 — DETAILED INFORMATION ▲
1614 — DISPLAY IMAGE ▲

1621 — CANCEL
1622 — OK

SYSTEM MONITOR

JOB COMBINATION: CHECKING/COMBINING BUNDLES

ERASE BUNDLE.

SELECT BUNDLE TO BE ERASED.

| TYPE | DOCUMENT NAME | PAPER SIZE | PAGE | DATE/TIME |
|---|---|---|---|---|
| 📄 | 006 | A4 | 4 | 08/02 12:43 |
| 📄 | 006 | A4 | 4 | 08/02 12:43 |
| 📄 | 006 | A4 | 4 | 08/02 12:43 |
| 📄 | 006 | A4 | 4 | 08/02 12:43 |

◀ 2/3 ▶  2112

SELECT ALL — 2111

CANCEL — 2121     OK — 2122

2100

SYSTEM MONITOR

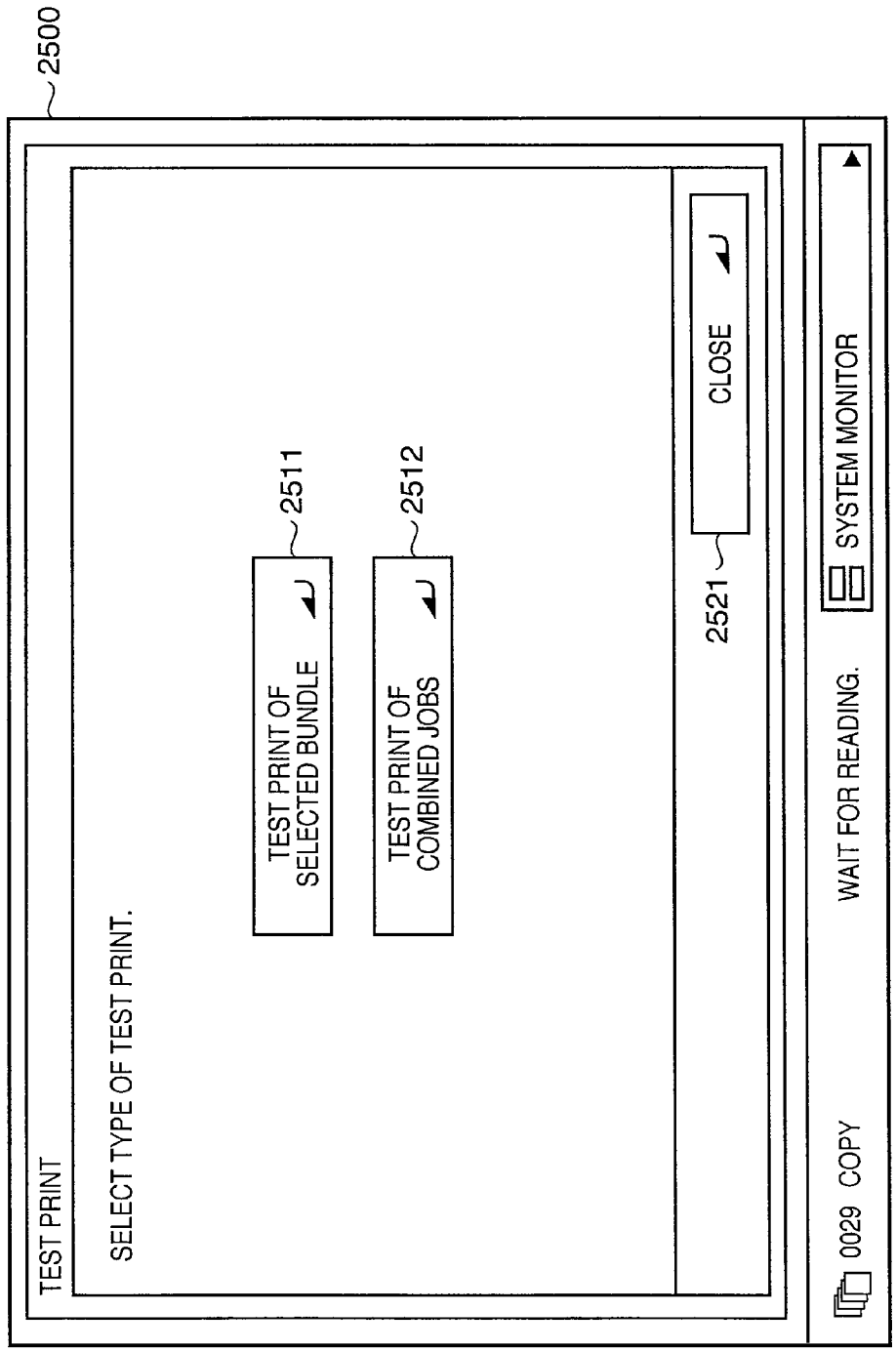

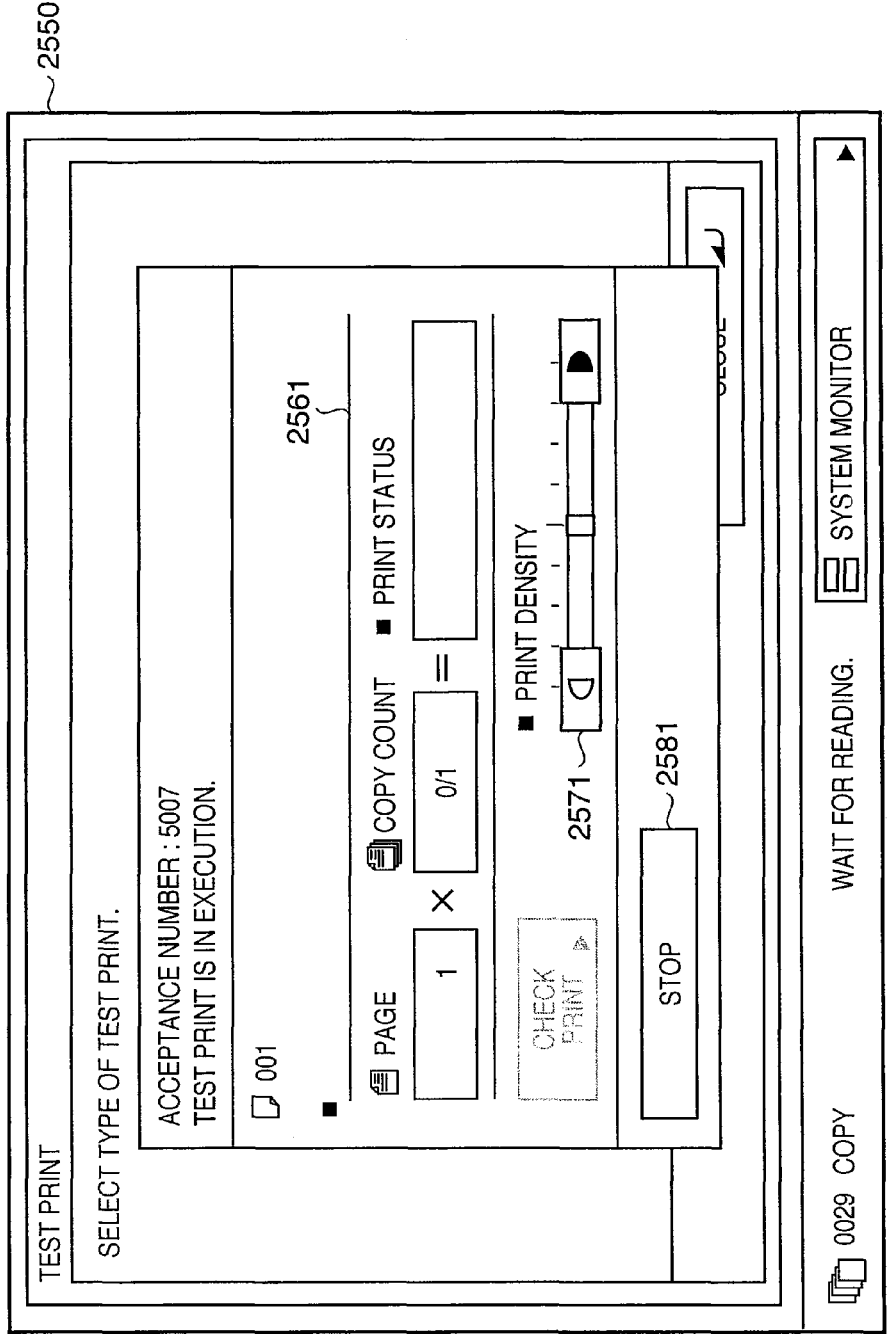

F I G. 27
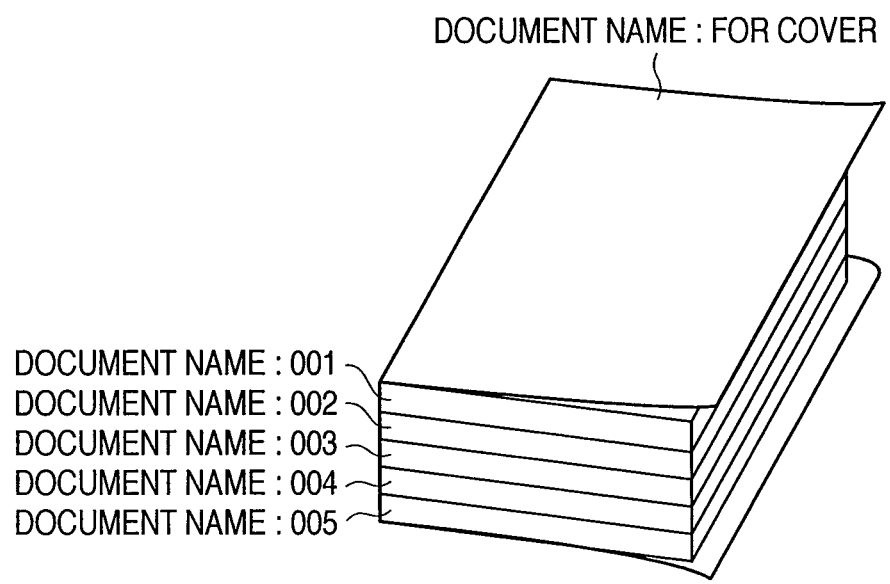

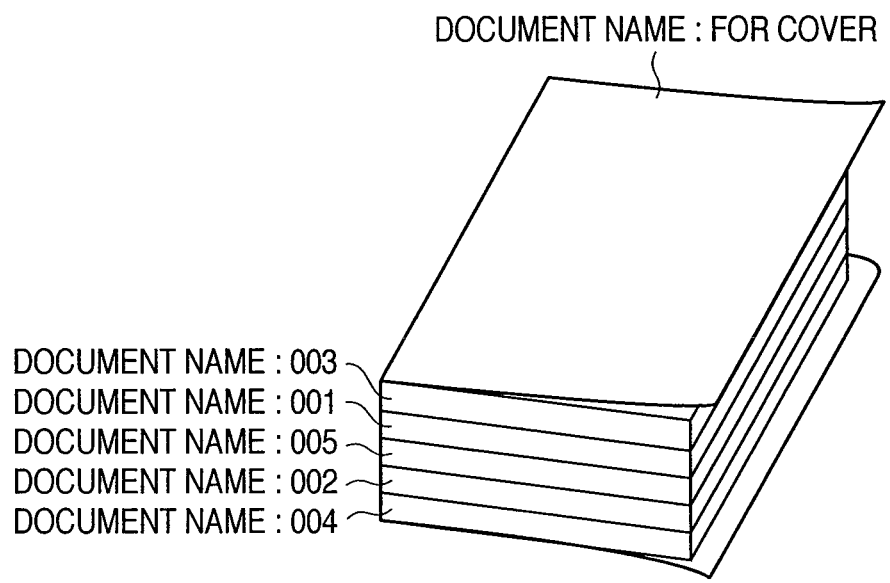
F I G. 28

PRINTING SYSTEM, APPARATUS AND CONTROL METHOD THEREFOR, STORAGE MEDIUM AND PROGRAM

BACKGROUND OF THE INVENTION

1. Field of the Invention

The present invention relates to a printing system, apparatus and its control method, storage medium and program.

2. Description of the Related Art

Job combination has recently been proposed as a function of a digital multifunction peripheral. Job combination is a function of creating printed materials from a plurality of documents combined into one job (see U.S. Pat. No. 6,512,899).

Job combination allows the user to generate a job while arbitrarily selecting jobs (documents) to be combined or canceling selection. Hence, it is necessary to inhibit selection of jobs to be combined or cancellation of selection in accordance with a specific setting. For example, a configuration which can case-bind job-combined printed materials is assumed. In this case, the user can neither execute a case binding process nor obtain a desired output result unless he selects a cover for case binding or a job (document) including the cover for case binding.

SUMMARY OF THE INVENTION

It is an object of the present invention to, when a predetermined finishing process is set in performing job combination, allow executing the finishing process at consistent settings by properly performing an inhibition process corresponding to the finishing process. It is another object of the present invention to inhibit creating an improper output result when creating a set of combined printed materials using a plurality of print data.

According to one aspect of the present invention, a printing system includes an input unit configured to input document data, a storage unit configured to store the document data input by the input unit, a printing unit configured to print based on a job of the document data stored in the storage unit, a finishing unit configured to be able to execute a plurality of finishing processes for a sheet printed by the printing unit, a combined job processing unit configured to combine a plurality of jobs into one job, cause the printing unit to print, and cause the finishing unit to perform a predetermined finishing process among the plurality of finishing processes, and a control unit configured to inhibit a predetermined job corresponding to the predetermined finishing process among the plurality of jobs from being excluded from targets of the predetermined finishing process when executing the combined job processing unit.

According to another aspect of the present invention, a method for controlling a printing system having an input unit configured to input document data, a storage unit configured to store the document data input by the input unit, a printing unit configured to print based on a job of the document data stored in the storage unit, and a finishing unit configured to be able to execute a plurality of finishing processes for a sheet printed by the printing unit is provided. The method includes a combined job processing step of combining a plurality of jobs into one job, causing the printing unit to print, and causing the finishing unit to perform a predetermined finishing process among the plurality of finishing processes, and a control step of inhibiting a predetermined job corresponding to the predetermined finishing process among the plurality of jobs from being excluded from targets of the predetermined finishing process when executing the combined job processing step.

According to still another aspect of the present invention, a printing system capable of causing a printing apparatus to print a job requiring a postpress by a postpress unit capable of executing a predetermined type of postpress is provided. The system includes a control unit configured to allow creating a set of combined printed materials by the printing apparatus using a plurality of print data sets, and a limitation unit configured to prevent creation of combined printed materials by the printing apparatus without using specific print data when using the predetermined type of postpress by the postpress unit.

According to yet another aspect of the present invention, a method of controlling a printing system capable of causing a printing apparatus to print a job requiring a postpress by a postpress unit capable of executing a predetermined type of postpress is provided. The method includes allowing creating a set of combined printed materials by the printing apparatus using a plurality of print data sets, and preventing creation of combined printed materials by the printing apparatus without using specific print data when using the predetermined type of postpress by the postpress unit.

According to still yet another aspect of the present invention, a printing apparatus adapted to supply sheets to a processor being capable of performing a predetermined postpress is provided. The apparatus includes a printing unit configured to print selected data item of a plurality of data items stored in a storage beforehand, the selected data item being selected based on user operation for selecting at least one of the plurality of data items by user interface, a determining unit configured to determine whether a predetermined instruction for the predetermined postpress is input, the predetermined instruction being input via the user interface, and a controlling unit configured to cause the printing unit to print predetermined data stored in the storage beforehand if it is determined that the predetermined instruction is input, wherein the predetermined postpress is processing for binding one set of sheets including a sheet as cover and another sheet, the predetermined data being printed on the sheet as cover, and the selected data item being printed on the other sheet.

According to yet still another aspect of the present invention, a controlling method adapted to a printing system configured to supply sheets to a processor being capable of performing a predetermined postpress is provided. The method includes causing a printing unit to print selected data item of a plurality of data items stored in a storage beforehand, the selected data item being selected based on user operation for selecting at least one of the plurality of data items by user interface, determining whether a predetermined instruction for the predetermined postpress is input, the predetermined instruction being input via the user interface and causing the printing unit to print predetermined data stored in the storage beforehand if it is determined that the predetermined instruction is input, wherein the predetermined postpress is processing for binding one set of sheets including a sheet as cover and another sheet, the predetermined data being printed on the sheet as cover, and the selected data item being printed on the other sheet.

Further features of the present invention will become apparent from the following description of exemplary embodiments with reference to the attached drawings.

BRIEF DESCRIPTION OF THE DRAWINGS

FIG. 16 is a view showing an example of a box document designation window when executing job combination in the embodiment;

FIG. 21 is a view showing an example of a bundle erase window when executing job combination in the embodiment;

FIGS. 25A and 25B are views showing an example of a test print execution window when executing job combination in the embodiment;

FIG. 27 is a view showing an example of an output result when executing job combination in the embodiment;

FIG. 28 is a view showing an example of an output result when executing job combination in the embodiment;

DESCRIPTION OF THE EMBODIMENTS

Figure 1:
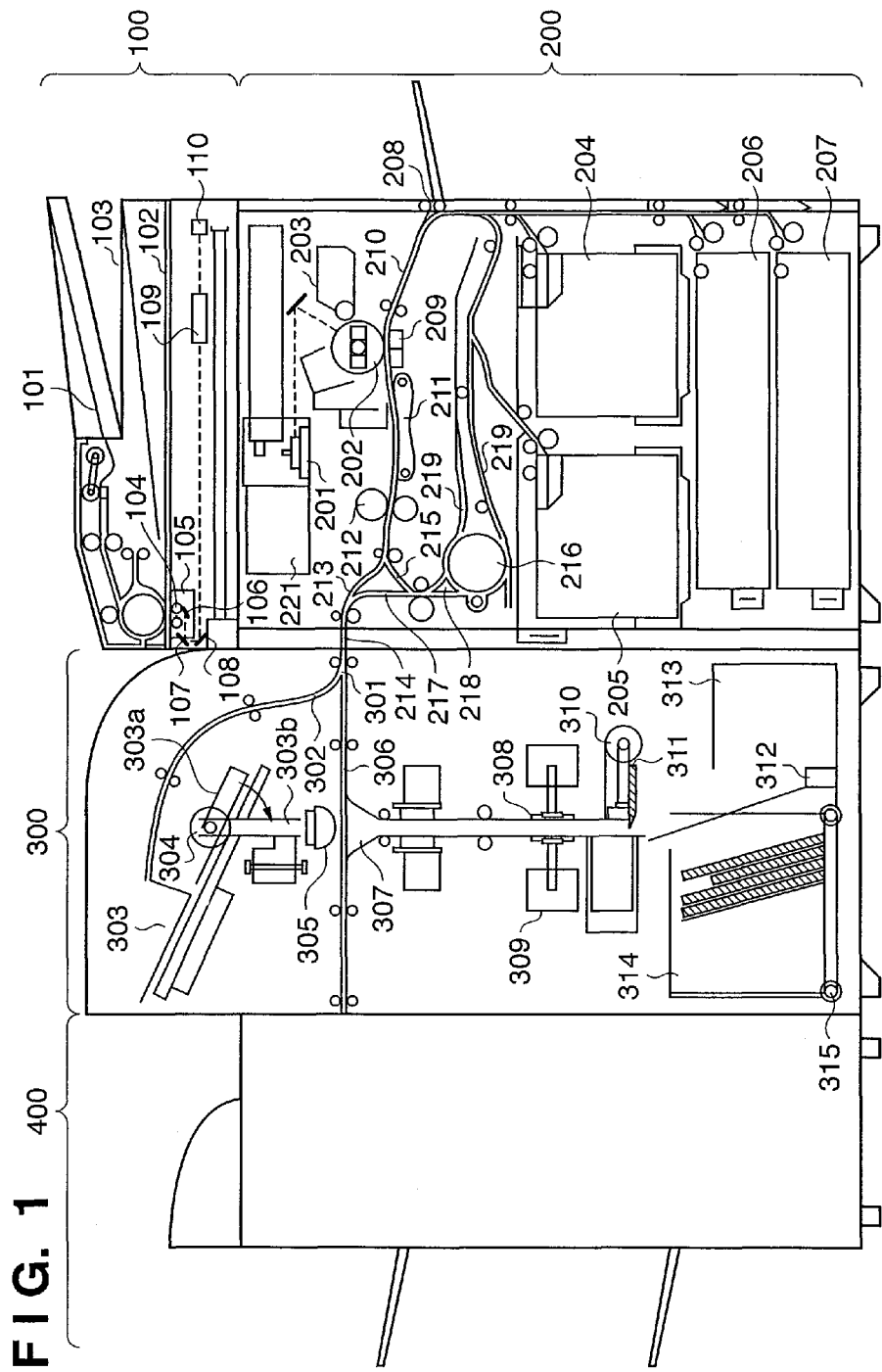
FIG. 1 is a schematic sectional view showing the arrangements of the scanner section, printer section, and case binding section of a printing system in an embodiment.

Various exemplary embodiments, features, and aspects of the present invention will be described in detail below with reference to the drawings. The present invention is not limited by the disclosure of the embodiments and all combinations of the features described in the embodiments are not always indispensable to solving means of the present invention.

The embodiment will exemplify a case binding process as a predetermined type of postpress (also called finishing process or sheet process). However, the predetermined type of postpress can also be a postpress other than the case binding process as far as the postpress is to create one output bundle using a cover sheet and non-cover sheets. A printing system 500 according to the embodiment allows a printing apparatus to print a job requiring a postpress by a post-processing unit capable of executing a predetermined type of postpress such as the case binding process.

In the embodiment, a controller unit 510 (see FIG. 2) controls the printing system 500 to be able to create a set of combined printed materials by a printing apparatus using a plurality of print data in an HDD 14. Especially in the embodiment, the controller unit 510 controls the printing system 500 to be able to create a set of combined printed materials by a printing apparatus using a plurality of print data selected by an operator operation via the UI unit. For this purpose, the job combination function is utilized in the embodiment. When performing a predetermined type of postpress, the controller unit 510 controls the printing apparatus to be able to create a set of combined printed materials using specific print data and a plurality of unspecific print data. The specific print data is, e.g., print data to be printed on a cover sheet. The plurality of unspecific print data are, e.g., body print data to be respectively printed on sheets such as body sheets different from a cover.

In the embodiment, when using the predetermined type of postpress, the controller unit 510 controls the UI unit not to accept a request from the user via the UI unit to exclude the specific print data from data used in creating combined printed materials.

When using the predetermined type of postpress in the printing system 500, the controller unit 510 controls the printing system 500 to inhibit printing in which the specific print data is excluded from data used in creating combined printed materials.

As described above, according to the embodiment, when using a predetermined type of postpress in the printing system 500, the controller unit 510 controls the printing system 500 to prevent creation of combined printed materials by the printing apparatus without using specific print data.

When using the predetermined type of postpress, the controller unit 510 controls the UI unit to permit accepting a request from the user via the UI unit to exclude arbitrary data from a plurality of unspecific print data used in creating combined printed materials.

When using the predetermined type of postpress, the controller unit 510 controls the UI unit to permit accepting a request from the user via the UI unit to change the print order of the plurality of unspecific print data in creating combined printed materials.

When using the predetermined type of postpress, the controller unit 510 controls the UI unit not to accept a request from the user via the UI unit to change the print order of the specific print data in creating combined printed materials.

The following embodiment will exemplify a configuration which prevents creation of combined printed materials by the printing apparatus without using specific print data when the printing system 500 uses a predetermined type of postpress. However, this may also be achieved by another method.

Assume that the user issues a request via the UI unit to execute a predetermined type of postpress. Even in this case, the controller unit 510 limits the actual operation of a post-processing unit to inhibit execution of the predetermined type of postpress so as not to execute it for combined printed materials which do not use the specific print data. The embodiment may also adopt this configuration.

The operation unit of the printing apparatus will be exemplified as an example of the UI unit. However, the operation unit of an external apparatus such as a host computer capable of transmitting a print job to a printing apparatus is also applicable as the UI unit.

Each arrangement of the printing system 500 configured as described above in the embodiment will be described.

Figure 2:
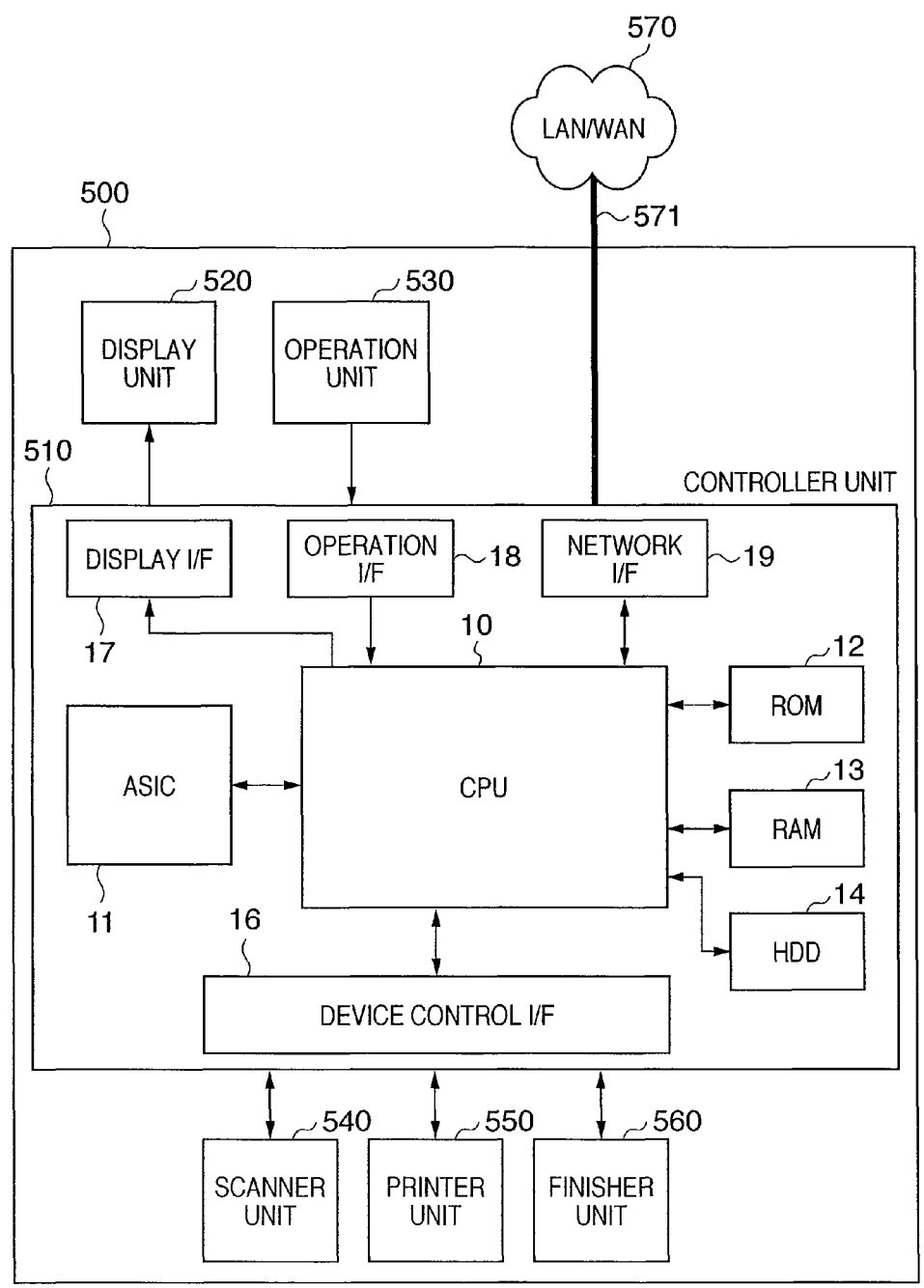
FIG. 2 is a block diagram showing the hardware configuration of the printing system in the embodiment.

FIG. 1 is a schematic sectional view showing the configuration of the printing system in the embodiment. FIG. 2 is a block diagram showing the hardware configuration of the printing system 500 in the embodiment. The printing system comprises one printing apparatus having a scanner section 100 and printer section 200, and two finishers (also called post-processing units or sheet processing units), i.e., a case binding section 300 and saddle stitching section 400. The printing system can execute a plurality of types of postpresses such as sorting, stapling, punching, case binding, saddle stitching, and trimming using these finishers. These finishers are also available as optional devices detachable from the printing apparatus.

The controller unit 510 accepts a request from the user via a user interface unit (UI unit) including a display unit 520 and operation unit 530 to execute a type of finishing desired by the user among a plurality of types of finishing selection candidates. The controller unit 510 causes the case binding section 300 or saddle stitching section 400 to execute the type of finishing requested by the user for sheets of a target job that are supplied from a printer unit 550.

The printing apparatus included in the printing system 500 has the job combination function. The job combination function will be explained below.

Figure 5:
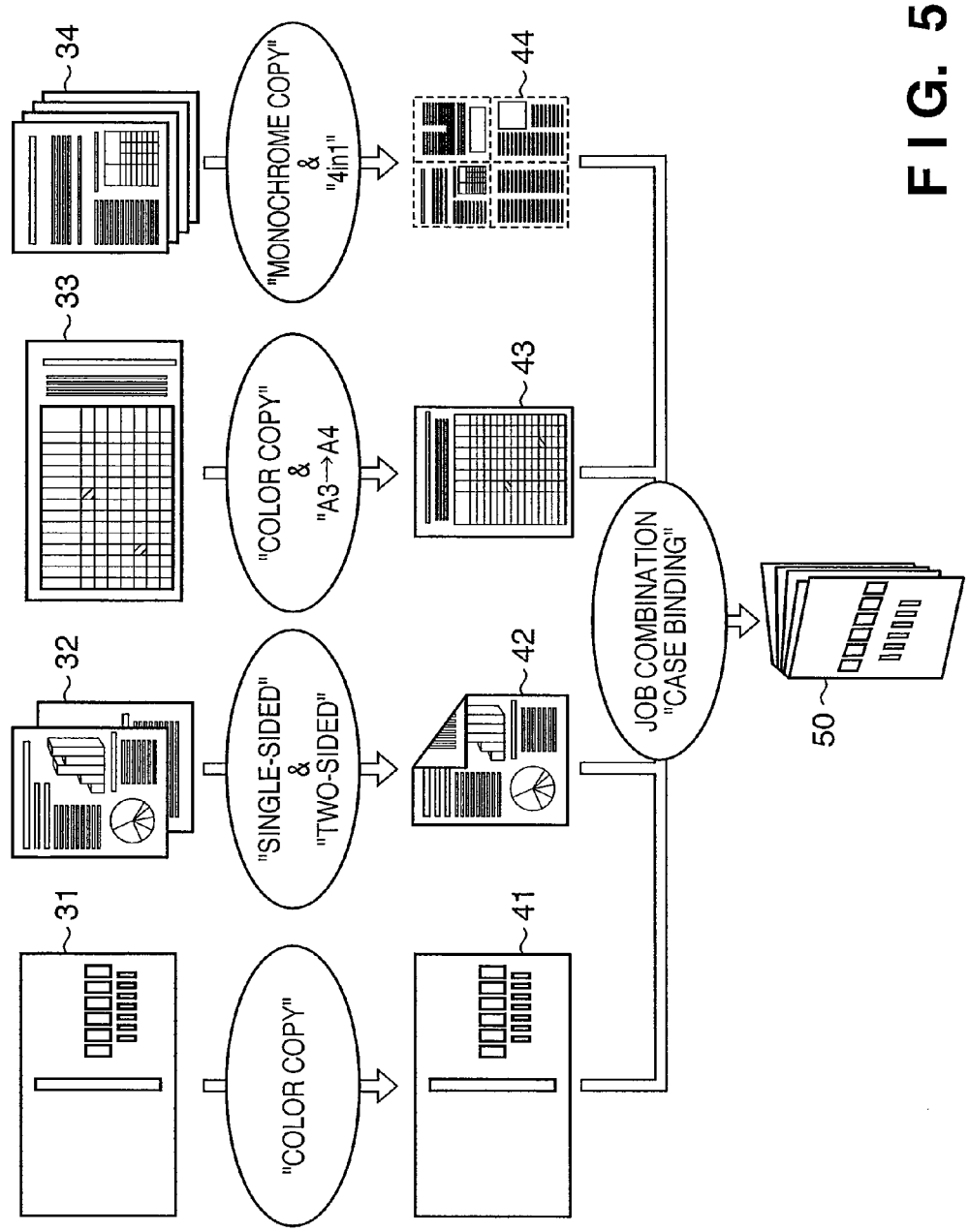
FIG. 5 is a view showing an outline of job combination.

FIG. 5 is a view showing an outline of the job combination function. FIG. 5 shows a job of generating output materials 41 to 44 from documents 31 to 34 in accordance with different settings. More specifically, the output material 41 is generated by color-copying the A3 color document 31 at an equal copy ratio. The output material 42 is generated as a result of a color copy job of scanning each side of the A4 color document 32 and printing the document 32 on the two surfaces of one sheet. The output material 43 is generated by microcopying the A3 color document 33 into an A4 document. The output material 44 is generated as a result of a 4in1 copy job using the A4 monochrome document 34 as an input original. In this specification, a function of reducing and laying out the contents of N pages into one page is called "Nin1". Hence, "4in1" means a function of laying out the contents of four pages into one page.

FIG. 5 shows a case binding process of binding the generated output materials 41 to 44 into one by job combination. Case binding is a bookbinding process of wrapping a bundle of printed body sheets in a cover and bonding the cover and the spine of the body sheet bundle with an adhesive. A printed material 50 is a final product generated by combining the output materials 42, 43, and 44 into one body and wrapping it in the output material 41 serving as a cover.

The printing system 500 according to the embodiment has the job combination function capable of printing out, as one bundle (one job), a plurality of document data (also called a plurality of jobs or a plurality of bundles) independent of each other which are stored in a memory such as the HDD 14.

The printing system 500 is configured to be able to accept, from the operation unit (FIG. 4) of the printing apparatus, a job combination function execution instruction and selection of a plurality of document data to be combined into one bundle.

Assume that print conditions (color mode, document size, enlargement/reduction ratio, and the like) are set independently for a plurality of document data to be job-combined. In this case, these documents to be job-combined are printed out in accordance with their settings using the job combination function. The printout documents can be combined into one job, finishing a set of printed materials.

A document feed unit 101 in the scanner section 100 feeds document sheets one by one from the first sheet onto a platen glass 102. After the end of reading the document sheet, the document sheet on the platen glass 102 is discharged onto a discharge tray 103. When the document sheet is conveyed onto the platen glass 102, a lamp 104 is turned on, and an optical unit 105 starts moving to expose and scan the document sheet. Reflected light from the document sheet is guided to a CCD (Charge Coupled Device) image sensor 110 by mirrors 106, 107, and 108 and a lens 109. The image of the scanned document is read by the CCD image sensor 110. The image data output from the CCD image sensor 110 undergoes a predetermined process, and then is transferred to the controller unit 510 in FIG. 2.

The arrangement of the printer section 200 will be explained together with its operation.

A laser driver 221 in the printer section 200 drives the laser emitting portion 201. The laser driver 221 causes a laser emitting portion 201 to emit a laser beam corresponding to the image data output from the controller unit 510. A photosensitive drum 202 is irradiated with the laser beam, forming a latent image corresponding to the laser beam on it. A developing unit 203 applies a developer to the latent image formed on the photosensitive drum 202.

The printer section 200 comprises, as paper storages, pull-out cassettes 204, 205, 206, and 207, and a manual feed tray 208 exposed outside the apparatus. The cassettes 204, 205, 206, and 207 are replenished with sheets by pulling out each cassette, setting paper in it, and closing it. A sensor is attached to each cassette, and detects the size and number of sheets set in the cassette.

A sheet is fed from any one of the cassettes 204, 205, 206, and 207 and the manual feed tray 208 at a timing synchronized with the start of laser beam irradiation. The sheet passes through a feeding path 210 to a transfer portion 209 where the developer attached to the photosensitive drum 202 is transferred to the sheet. The sheet bearing the developer is conveyed to a fixing unit 212 by a conveyance belt 211. The developer is fixed to the sheet by the heat and pressure of the fixing unit 212. The sheet having passed through the fixing unit 212 passes through feeding paths 213 and 214, and is discharged to the case binding section 300. When discharging a sheet by reversing its printed surface, the sheet is guided to feeding paths 215 and 216. Then, the sheet is conveyed in the opposite direction, and discharged via a feeding path 217 and the feeding path 214.

When two-sided printing is set, the sheet is guided to a feeding path 219 via a flapper 218 from the feeding path 215 after passing through the fixing unit 212. Then, the sheet is conveyed in the opposite direction, and guided to the feeding path 216 and a refeeding path 219 via the flapper 218. The sheet guided to the refeeding path 219 passes through the feeding path 210 at the above-described timing, and is fed to the transfer portion 209. The sheet undergoes the above-described fixing and transfer. Then, the sheet passes through the feeding path 214, and is discharged to the case binding section 300.

The arrangement of the case binding section 300 will be explained together with its operation.

The sheet discharged from the feeding path 214 of the printer section 200 is conveyed to a feeding path 301 of the case binding section 300. At this time, when the job does not require a case binding process, the sheet passes through a feeding path 306 and is discharged to the saddle stitching section 400.

When the job requires a case binding process, a sheet serving as a case binding body is guided to a feeding path 302 and stocked in a sheet stocker 303. After a predetermined number of sheets are stocked in the sheet stocker 303 and a sheet bundle serving as a case binding body is generated, the sheet stocker 303 slides to a position 303a. While holding the stocked sheet bundle, the sheet stocker 303 rotates on a rotating shaft 304 to a position 303b, making the sheet bundle upright. The sheet bundle is moved vertically down, and an adhesive applicator 305 applies an adhesive to one edge of the sheet bundle. After the end of applying the adhesive, the sheet bundle waits at a predetermined position.

While generating the sheet bundle serving as a case binding body and applying the adhesive to it, a sheet serving as a case binding cover passes through the feeding path 301 to the feeding path 306, and waits at a predetermined position on the feeding path 306.

The sheet bundle serving as a case binding body which waits at the predetermined position is further moved vertically down. The cover and the body sheet bundle are bonded to each other by pushing the adhesive-applied edge of the sheet bundle against the cover waiting at the predetermined position on the feeding path 306. The sheet bundle is pushed against the cover so as to guide the sheet bundle to a feeding path 307. The cover is folded along the sheet bundle (in accordance with the thickness of the sheet bundle) by pressing the cover horizontally from the two sides of the sheet bundle.

Then, the cover-bonded sheet bundle is trimmed.

The cover-bonded sheet bundle is further guided vertically down through the feeding path 307, and fixed at a predetermined position by a gripper 308. The fixed sheet bundle is rotated by a rotating table 309 through 90° in the back-and-forth direction when the sectional view of FIG. 1 is viewed from the front. The rotated sheet bundle is moved vertically down to the position of a cutting knife 311. The sheet bundle is fixed while protruding by a cutting length. The cutting knife 311 is moved horizontally by a cutting unit 310 so as to trace a circular arc, and cuts one edge of the sheet bundle. This cutting process is done for three edges free from the adhesive, generating a sheet bundle of an arbitrary size. The cutting process includes a case where no edge is cut in accordance with the finishing size of the sheet bundle, and a case where only one edge opposite to an adhesive-applied edge is cut.

Cutting dust produced upon trimming is guided to a cutting dust storage 313 via a flapper 312.

The trimmed sheet bundle is released and falls down into a sheet bundle storage 314. In the sheet bundle storage 314, every time a sheet bundle is discharged, the entire stored sheet bundle is moved by a conveyor 315 to ensure a space for storing a sheet bundle to be discharged next.

The saddle stitching section 400 is a post-processing unit which performs postpresses such as binding and folding. A sheet (not to be case-bound) discharged through the feeding path 306 of the case binding section is guided to a feeding path in the saddle stitching section 400, and delivered to an arbitrary delivery tray.

The hardware configuration (FIG. 2) of the printing system 500 in the embodiment will be described in detail.

The printing system 500 comprises the controller unit 510, the display unit 520, the operation unit 530, a scanner unit 540, the printer unit 550, and a finisher unit 560.

The display unit 520 has an LED (Light Emitting Device) and liquid crystal display. The display unit 520 displays the contents of an operation by the operator and the internal state of the apparatus. The operation unit 530 accepts an operation from the operator. The operation unit 530 has a plurality of operation buttons. The operation unit 530 may also be implemented as a touch display together with the display unit 520.

The scanner unit 540 corresponds to the scanner section 100 in FIG. 1, and scans an original as image data. The printer unit 550 serving as a printout means corresponds to the printer section 200 in FIG. 1, and prints image data on a sheet. The printer unit 550 notifies, via a device control I/F (InterFace) 16, the abnormal state of the printer including the feeding and delivery timings, jam, and the absence of paper. The finisher unit 560 serving as a finishing means corresponds to the case binding section 300 and saddle stitching section 400 in FIG. 1, and performs a finishing process for a sheet printed out by the printer unit. The finisher unit 560 can selectively execute a plurality of types of finishing processes.

The controller unit 510 comprise a CPU 10, an ASIC 11, a ROM 12, a RAM 13, the HDD 14, the device control I/F 16, a display I/F 17, an operation I/F 18, and a network I/F 19.

The CPU 10 serving as a control means is a main processor for a control program installed in the printing system 500. The CPU 10 controls the operations of devices connected to the controller unit 510 via I/Fs, memories serving as storage media, and dedicated chips. The ASIC 11 is an application specific chip, and performs a specific process such as an image process separately from the CPU 10. The ROM 12 is a nonvolatile memory, the RAM 13 is a volatile memory, and the HDD 14 is a storage medium such as a magnetic disk. The ROM 12 or HDD 14 stores a control program and the like, and the control program is expanded in the RAM 13 in execution. The RAM 13 operates as a work memory when executing the control program on the CPU 10, and stores a print job and image data to be printed. The HDD 14 serving as a storage means also stores a print job and image data to be printed. Note that FIG. 2 shows only one CPU 10, one ASIC 11, one ROM 12, one RAM 13, and one HDD 14. However, pluralities of CPUs, ASICs, ROMs, RAMs, and HDDs may also be adopted as another embodiment, and their arrangement and connection form are not limited to the embodiment.

The device control I/F 16 controls input/output to/from devices (scanner unit 540, printer unit 550, and finisher unit 560) connected to the controller unit 510. The device control I/F 16 is implemented as a bus structure capable of connecting a plurality of devices. In some cases, the device control I/F 16 is divided into a plurality of I/Fs in one-to-one correspondence with connected devices. The display I/F 17 controls output to the display unit 520. The operation I/F 18 controls input from the operation unit 530.

The printing system 500 has the network I/F 19 as an external I/F. The printing system 500 is connected by a network cable 571 via the network I/F 19 to a LAN/WAN 570 serving as the Internet or an intranet (in practice, the printing system 500 is connected to a hub or server/client which forms the LAN/WAN). The network I/F 19 controls data input/output to/from the network.

Figure 3:
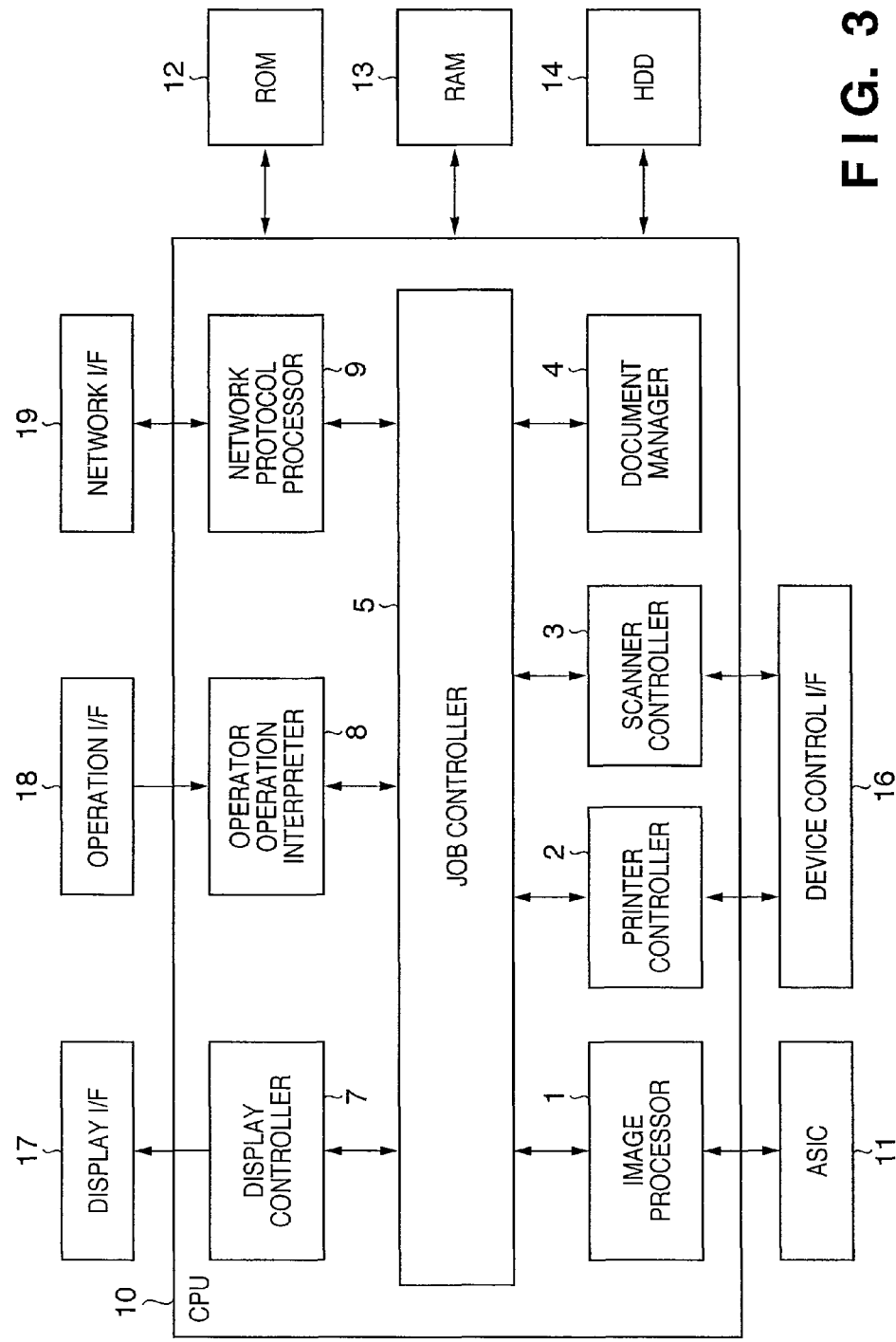
FIG. 3 is a block diagram showing a functional configuration based on a control program installed in the printing apparatus in the embodiment.

FIG. 3 is a block diagram showing the functional configuration of the CPU 10 based on a control program installed in the printing apparatus in the embodiment.

The CPU 10 and the I/Fs 16 to 19 connected to the CPU 10, the ASIC 11, the ROM 12, the RAM 13, and the HDD 14 in FIG. 3 are the same as those in FIG. 2.

The control program installed in the printing apparatus according to the embodiment runs on the CPU 10 while using the RAM 13. The control program includes a display controller 7, operator operation interpreter 8, network protocol processor 9, job controller 5, image processor 1, printer controller 2, scanner controller 3, and document manager 4.

The display controller 7 receives information on the states of the job and apparatus from the job controller 5. The display controller 7 transmits a command to the display I/F 17 to reflect the information on the display screen.

The operator operation interpreter 8 receives an operation command from the operation I/F 18. The operator operation interpreter 8 issues, to the job controller 5, various instructions such as the start, interrupt, resume, and end of a job.

The network protocol processor 9 transmits/receives data via the network I/F 19 by processing standard network protocols including TCP/IP.

The image processor 1 receives image data, and performs image processes such as image decompression/compression and rotation by controlling parameter settings and the data transmission/reception timing to the ASIC 11.

The printer controller 2 controls the operations of the printer unit 550 and finisher unit 560 via the device control I/F 16 to print image data on a sheet and perform a postpress for the printed sheet. The scanner controller 3 controls the scanner unit 540 via the device control I/F 16 to scan an original as image data.

The document manager 4 stores image data, and various pieces of setting information and attributes associated with the image data at once in the HDD 14 serving as a storage means. Also, the document manager 4 reads out image data and its associated setting information and attributes which are stored in the HDD 14.

The job controller 5 receives the jobs of a user operation and externally received document data, and manages these jobs. In addition, the job controller 5 systematically controls the operation of the whole device in conjunction with the control programs 1 to 4 and 7 to 9 in accordance with the job contents. The job controller 5 functions as a combined job processing means for executing job combination of combining a plurality of jobs into one, causing the printer unit 550 to print out, and performing a predetermined finishing process out of a plurality of finishing processes.

Figure 4:
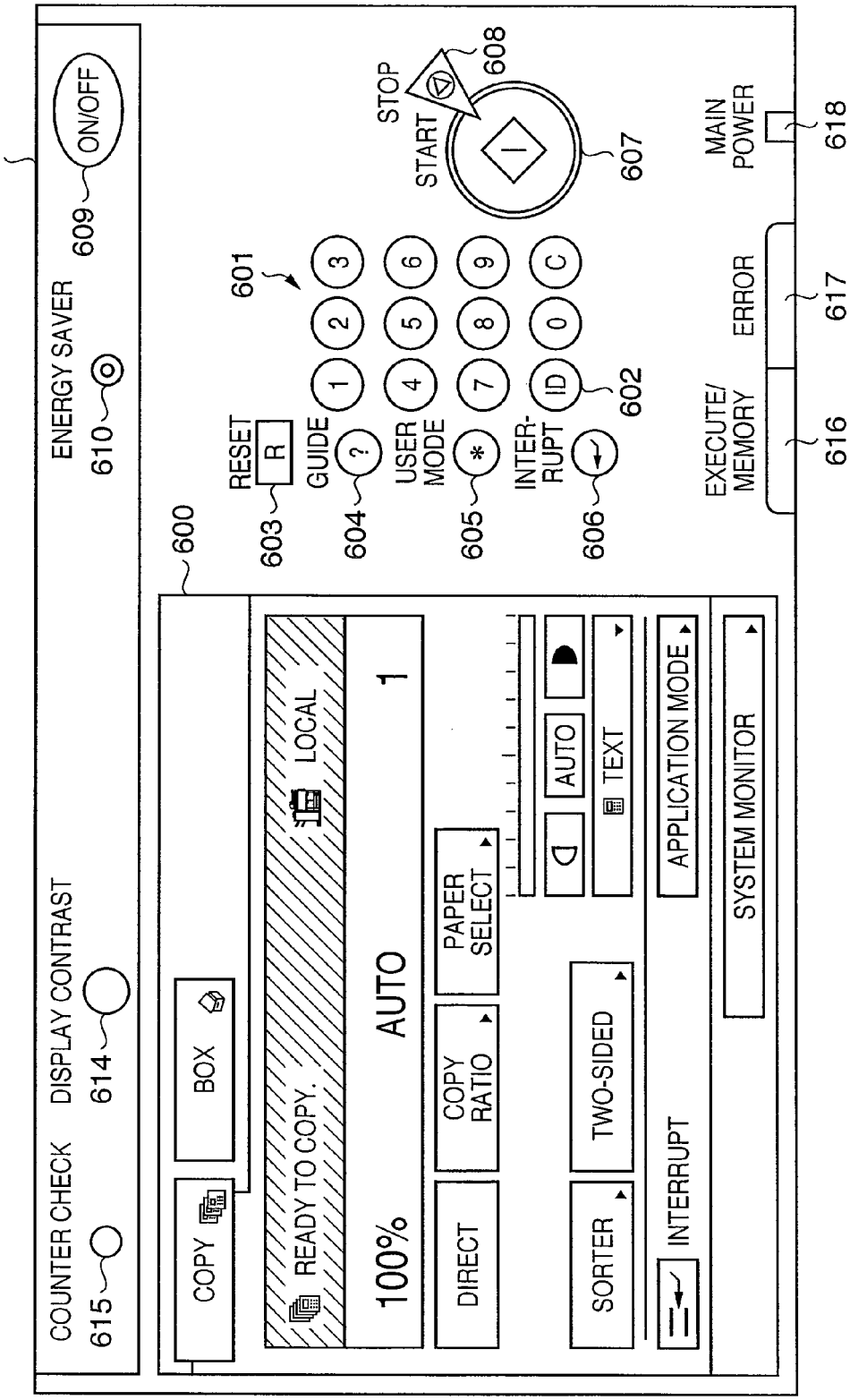
FIG. 4 is a view showing the arrangements of the display unit and operation unit of the printing apparatus in the embodiment.

FIG. 4 is a view showing the arrangements of the display unit 520 and operation unit 530.

An LCD (Liquid Crystal Display) touch panel 600 allows main mode setting and displays the status. A ten-key pad 601 is used to input numerical values of 0 to 9. An ID key 602 is used to input a department number and password mode when the apparatus is under department management.

A reset key 603 is used to reset a set mode. A guide key 604 is used to display a guide window for each mode. A user mode key 605 is used to enter a user mode window. An interrupt key 606 is used to perform interrupt copy.

A start key 607 is used to start a copy operation. A stop key 608 is used to stop a copy job in execution.

When the user presses a soft power switch 609, the backlight of the LCD touch panel 600 is turned off, and the apparatus changes to the low-power state. The apparatus changes to the power saving state when the user presses an energy saver key 610, and returns from the power saving state when he presses it again.

An adjustment key 614 is used to adjust the contrast of the LCD touch panel 600.

When the user presses a counter check key 615, the LCD touch panel 600 displays a count window showing the total copy count.

An LED 616 indicates that a job is in execution or an image is being stored in the image memory. An error LED 617 indicates that an error such as a jam or opening of the door occurs in the apparatus. A power LED 618 indicates that the main switch of the apparatus is ON.

Figure 6:
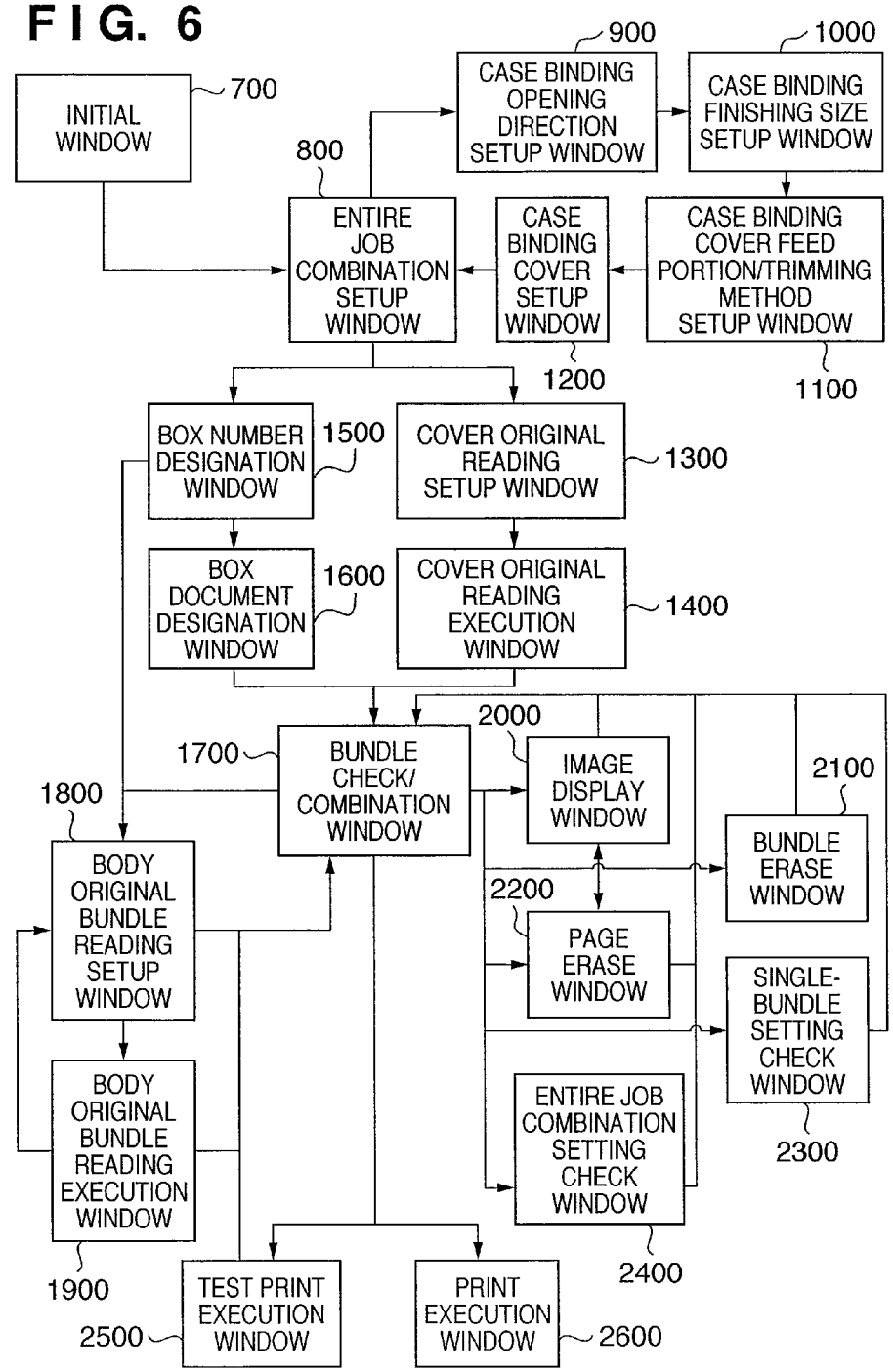
FIG. 6 is a view showing an example of transition of the operation window when executing job combination in the embodiment.

FIG. 6 is a view showing an example of transition of the operation window when executing job combination of combining a plurality of jobs into one in the printing apparatus according to the embodiment. The job controller 5 executes job combination and controls the transition of the operation window at this time. In this manner, the job controller 5 controls the operation of a user interface unit (to be referred to as a UI hereinafter) including the display unit 520 and operation unit 530. FIG. 6 shows a concrete example of executing job combination and a case binding process. FIGS. 7 to 26 show concrete examples of operation windows shown in FIG. 6. The embodiment will exemplify a configuration in which the job controller 5 controls the UI to selectively display operation windows corresponding to user requests in response to various user operations accepted from the user via the UI. However, it is also possible that the job controller 5 performs control regarding an actual job process such as a printing operation in the printing apparatus, and another unit such as a UI controller performs control regarding the UI. Note that the printing apparatus in FIG. 1 comprises the units shown in FIG. 2 except the finisher unit 560.

Figure 7:
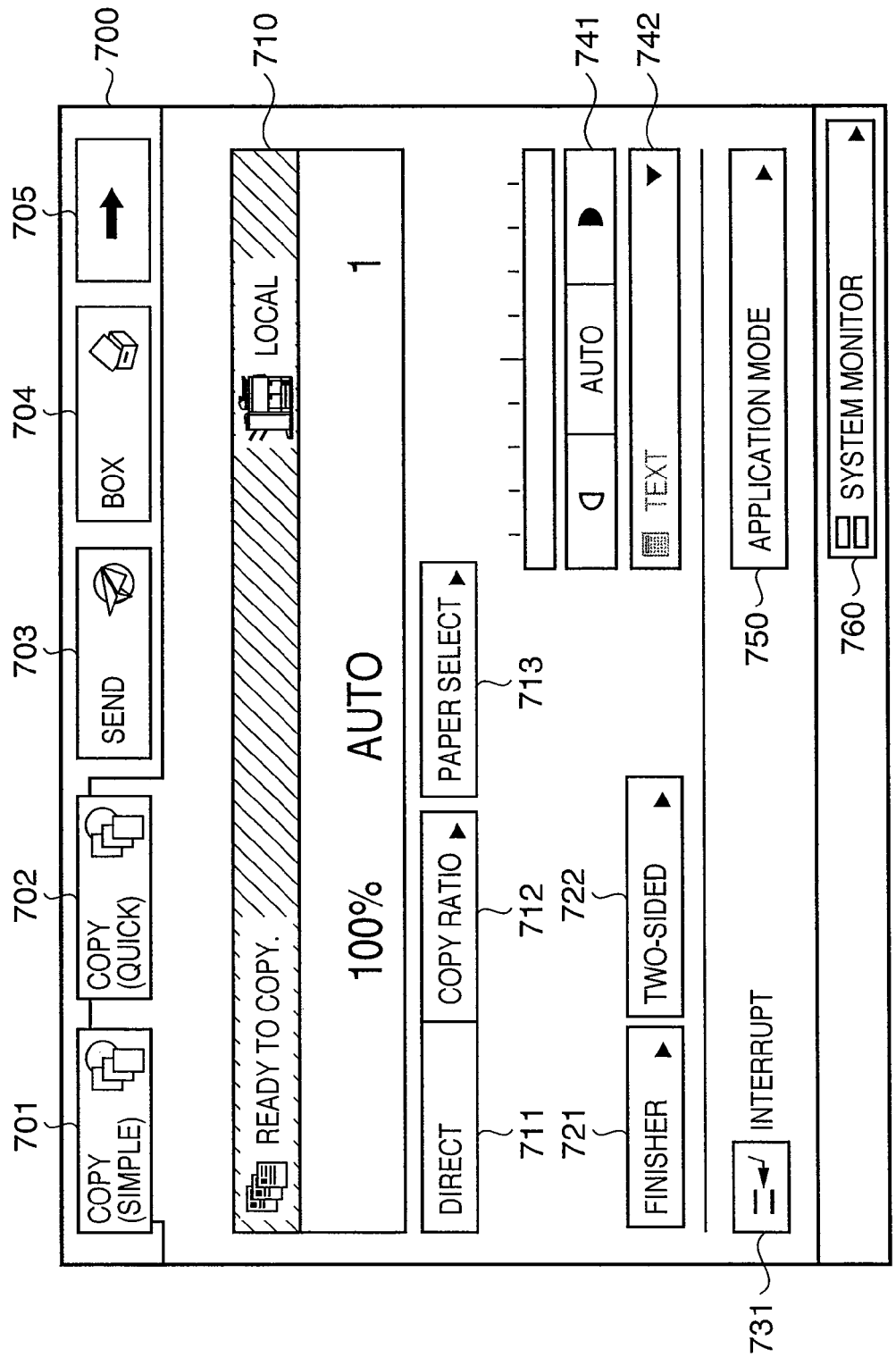
FIG. 7 is a view showing an example of an initial window when executing job combination in the embodiment.

FIG. 7 is a view showing an example of an initial window in the transition of the operation window when executing job combination shown in FIG. 6.

An initial window 700 shows a state in which a copy (simple) window is displayed. The initial window 700 has various function select tabs 701 to 705, a device information/setting information display portion 710, various copy setting buttons 711 to 742, an interrupt copy button 731, an application mode setting button 750, and a system monitor button 760.

The copy (simple) tab 701 and copy (quick) tab 702 allow copying when the user presses them. The copy (simple) tab 701 and copy (quick) tab 702 enable the same copy function, but provide different usabilities depending on the difference in window arrangement.

The box tab 704 enables a box function. The box function is to store, in the HDD 14 serving as a storage means, scanned document data or image data transmitted from an external host computer or external digital multifunction peripheral connected via a LAN/WAN.

In general, the copy (simple) tab 701 is selected as a default. In this case, the scanner section 100 which scans an original sheet functions as an input means for inputting document data to be printed out. When the box tab 704 is selected to execute the box function, a configuration which receives, via the network I/F 19, document data transmitted from an external device such as a host computer functions as an input means.

The send tab 703 is used to execute a send function of sending, to an external apparatus, a scanned document or a document stored by the box function. The send function sends a document by e-mail transmission, FAX transmission, or file transmission. A document is sent using SMTP in e-mail transmission, the G3/G4 standard in FAX transmission, or FTP/SMB in file transmission.

When the user presses the right arrow tab 705, function select tabs other than the tabs 701 to 704 are displayed.

The device information/setting information display portion 710 displays device information and copy setting information.

The direct button 711 is used to set the copy ratio to an equal ratio (100%). The copy ratio button 712 is used to set an arbitrary copy ratio. The paper select button 713 is used to select paper. When the user presses this button, feed cassette information is displayed to allow him to select a cassette for feeding output paper. The user can also select an automatic paper select mode in which output paper is automatically determined from the size of a document scanned by the scanner. The finisher button 721 is used to make output order settings including sort, non-sort, shift sort, rotation sort, and group sort, and finishing settings including punching, stapling, and folding. The two-sided button 722 is used to select a one-sided/two-sided original and one-sided/two-sided output in combination. The density adjust button 741 is used to set a copy output density. The document mode select button 742 is used to set a document mode. Selectable document modes include the text, photo, and map.

The system monitor button 760 is used to display a list of various jobs in execution in the device, the log of executed jobs, feed/delivery tray information, and error information. The list of jobs in execution allows selecting a job from the list, and suspending/stopping the selected job. In addition, the list displays detailed information of the selected job. The job log displays detailed information of an executed job, and the log contents can be printed out. A feed tray arrangement is displayed as feed tray information, and information including the paper size, paper type, presence/absence of paper is displayed for each feed tray. A delivery tray arrangement is displayed as delivery tray information, and a delivery tray full state is displayed. An error such as a jam position or the absence of paper is displayed as error information.

The interrupt button 731 is used to set interrupt copy.

The application mode setting button 750 is used to set various application modes. When the user presses the button 750, the job controller 5 causes the display unit 520 to display an application mode window (not shown). The application mode window (not shown) is a UI window configured to allow the user to select one or a plurality of desired modes (also called functions) from a plurality of process modes associated with printing executable by the printing apparatus. Application modes permitted to be accepted via this UI window from the user for a target job include a cover/sheet insertion mode, reduction layout (Nin1) mode, image moving mode, booklet mode, transparency interleaving mode, and index sheet creation mode. In addition, application modes include an image compositing mode, copy-forgery-inhibited pattern print mode, page print/copy count print mode, stamp/date print mode, and job combination mode. When the user selects the job combination mode, the window changes to an entire job combination setup window 800.

Figure 8:
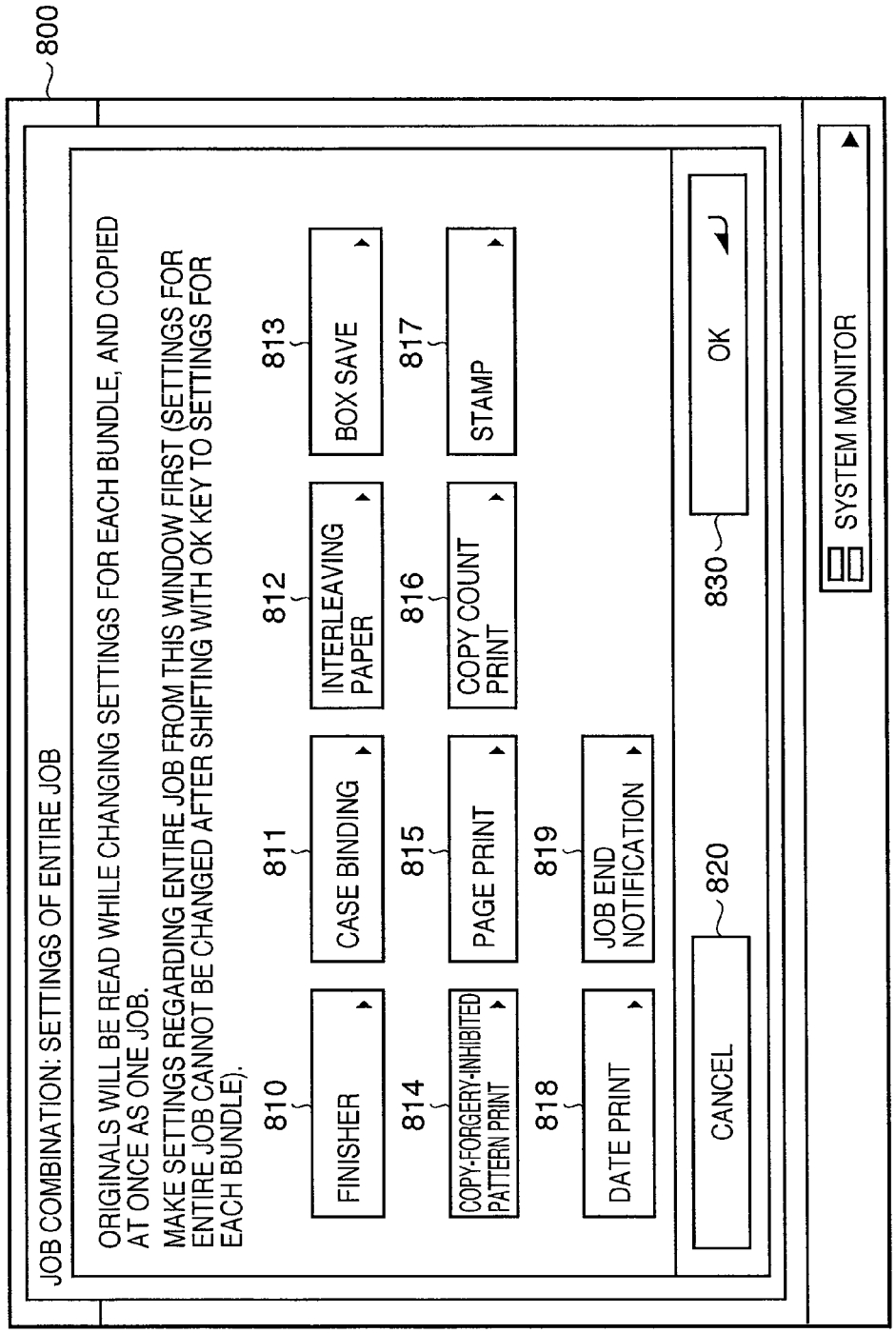
FIG. 8 is a view showing an example of an entire job combination setup window when executing job combination in the embodiment.

FIG. 8 is a view showing an example of the entire job combination setup window in the transition of the operation window when executing job combination shown in FIG. 6.

The entire job combination setup window 800 has various setting buttons 810 to 819, a cancel button 820, and an OK button 830.

The user makes settings regarding an entire job by selecting the setting buttons 810 to 819. By pressing the OK button 830, the user continues execution of a combined job with contents set with the setting buttons 810 to 819. The cancel button 820 is used to cancel the setting of the job combination mode.

The finisher button 810 is used to make output order settings including sort, shift sort, and rotation sort, and finishing settings including punching, stapling, and folding.

The interleaving paper button 812 is used to set interleaving paper for separating an original bundle from the next one. The interleaving paper button 812 allows setting an interleaving paper feed source and the paper type.

The box save button 813 is used to store data of all job-combined original bundles at once in the apparatus using the box function. Simultaneously when saving data in the box, it can also be selected whether or not to print out.

The copy-forgery-inhibited pattern print button 814 is used to set copy-forgery-inhibited pattern print, and allows setting the type and color of copy-forgery-inhibited pattern print. The type of copy-forgery-inhibited pattern print includes the stamp of a specific character string, that of an arbitrary character string, date, copy count, serial number, and department ID.

The page print button 815 is used to make page print settings including the print type, print color, and print position. The copy count printing button 816 is used to make copy count print settings including the print orientation, print position, print start copy count, print size, and print density.

The stamp button 817 is used to make stamp print settings including the print orientation, print position, and the type of character string to be printed. The date printing button 818 is used to make date print settings including the print orientation, print position, and date form.

The job end notification button 819 is used to notify an external host machine of the end of executing a combined job. At this time, the user can set the address of the external host machine to be notified of the end of execution.

The case binding button 811 is used to set case binding. When the user presses the case binding button 811, the window changes to a case binding opening direction setup window.

Figure 9:
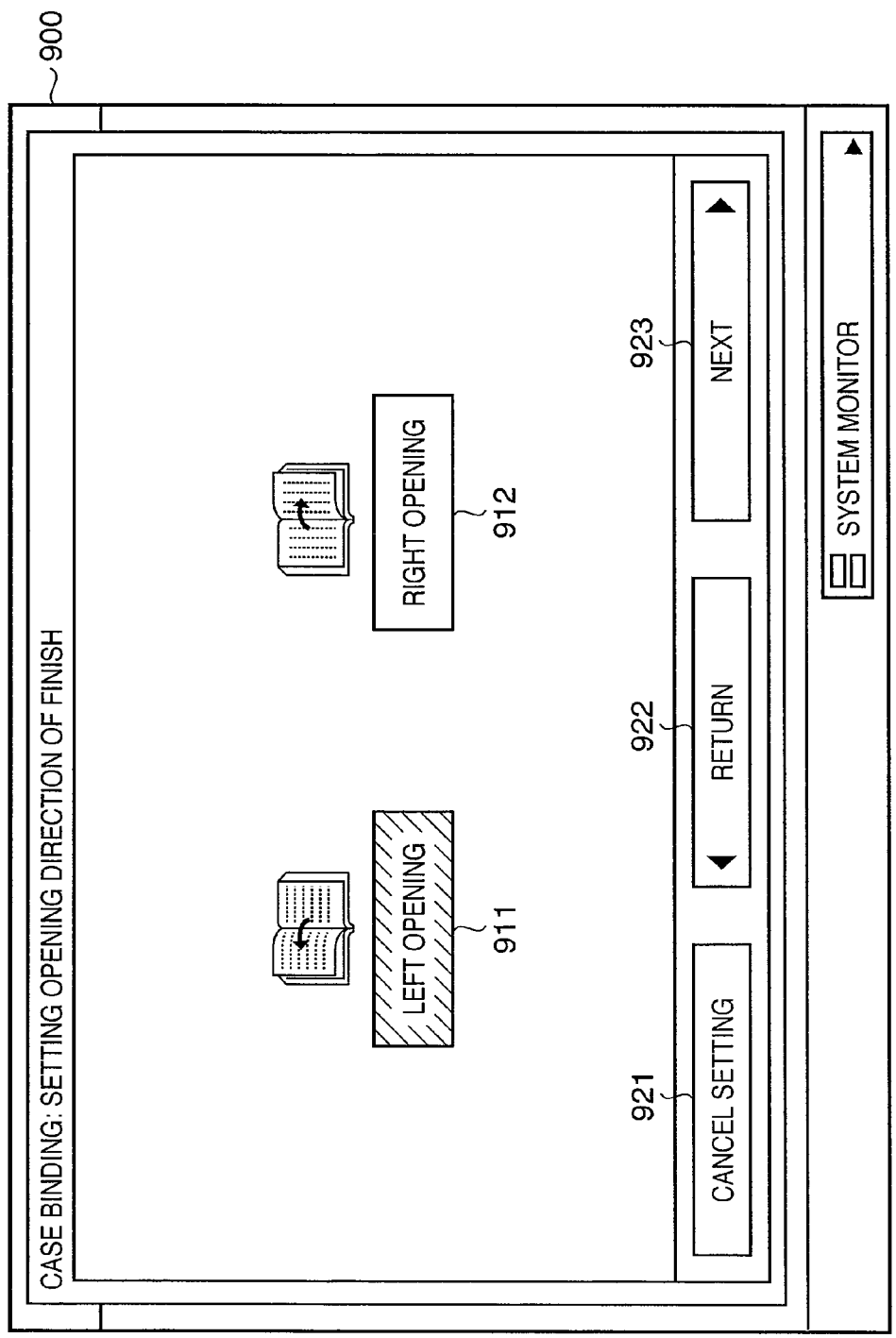
FIG. 9 is a view showing an example of a case binding opening direction setup window when executing job combination in the embodiment.

FIG. 9 is a view showing an example of the case binding opening direction setup window in the transition of the operation window when executing job combination shown in FIG. 6.

A case binding opening direction setup window 900 has opening setting buttons 911 and 912, a setting cancel button 921, a "return" button 922, and a "next" button 923.

The left opening button 911 is used to set the opening direction of case binding to left opening. The right opening button 912 is used to set the opening direction of case binding to right opening. It is controlled to enable setting only either the left opening button 911 or right opening button 912.

The setting cancel button 921 is used to cancel setting of case binding. When the user presses the setting cancel button 921, the window changes to the entire job combination setup window 800, and setting of case binding is disabled.

The "return" button 922 is used to return to an immediately preceding window. The "next" button 923 is used to continue setting of case binding. When the user presses this button, the window changes to a case binding finishing size setup window 1000.

Figure 10:
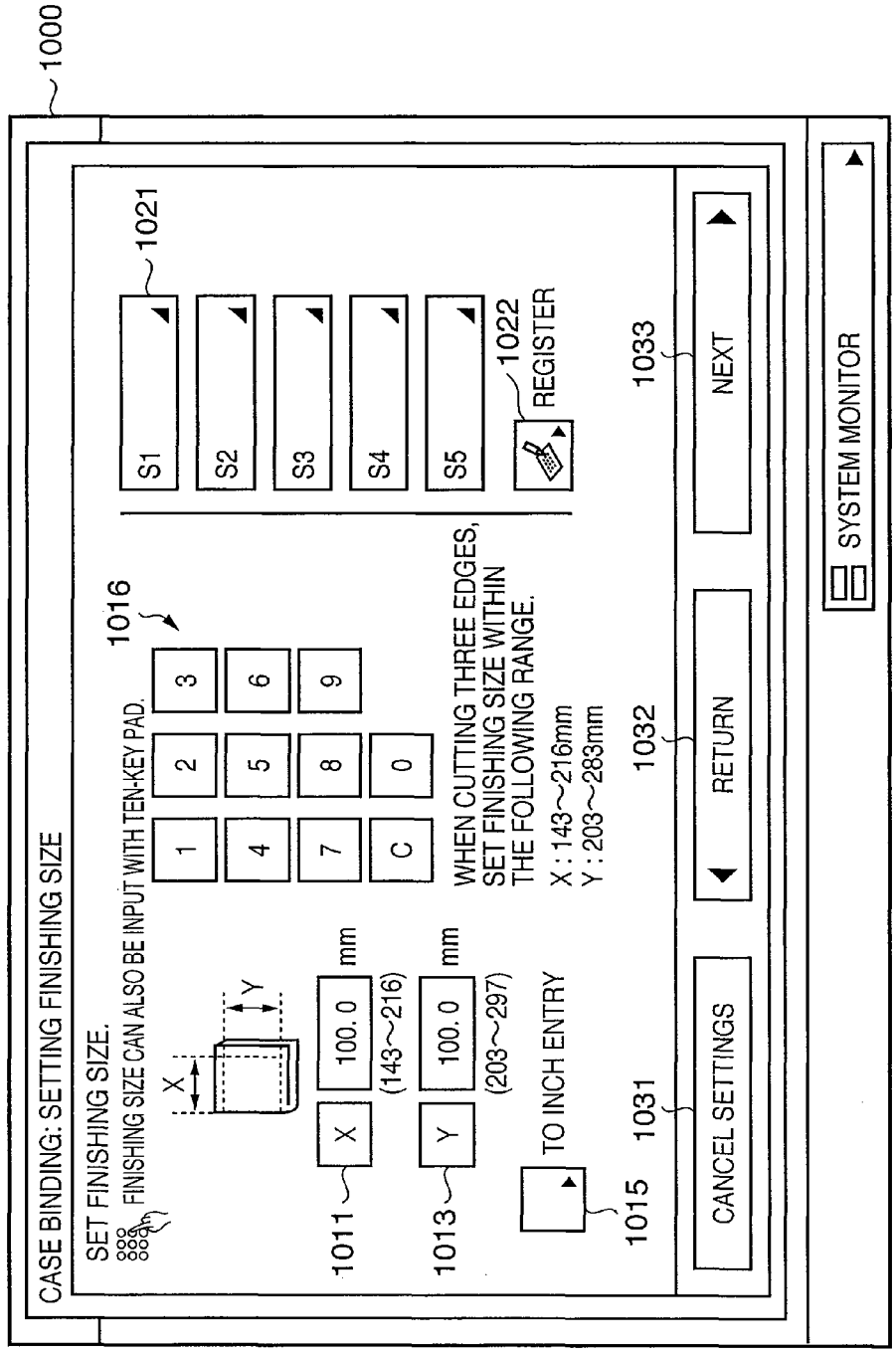
FIG. 10 is a view showing an example of a case binding finishing size setup window when executing job combination in the embodiment.

FIG. 10 is a view showing an example of the case binding finishing size setup window in the transition of the operation window when executing job combination shown in FIG. 6.

The case binding finishing size setup window 1000 has buttons 1011, 1013, 1015, 1016, 1021, and 1022 for setting the finishing size, and set finishing size display portions 1012 and 1014. The case binding finishing size setup window 1000 also has a setting cancel button 1031, "return" button 1032, and "next" button 1033.

The ten-key pad 1016 is used to input numerical values of 0 to 9. The "C" button of the ten-key pad 1016 is used to clear an input numerical value.

The width input designation button 1011 is used to designate the width of the finishing size. After pressing the width input designation button 1011, the user can input the width of the finishing size using the ten-key pad 1016. The finishing size display portion 1012 displays the input width.

The height input designation button 1013 is used to designate the height of the finishing size. After pressing the height input designation button 1013, the user can input the height of the finishing size using the ten-key pad 1016. The finishing size display portion 1014 displays the input height.

Even with the ten-key pad 601 of the operation unit 530 shown in FIG. 4, the user can also input the numerical values of the width and height of the finishing size.

If the user inputs a finishing size which cannot be processed in case binding by the case binding section 300, it is controlled not to display the input value on either the finishing size display portion 1012 or 1014, and to disable it. Further, a popup window appears to notify the user that he has input the finishing size which cannot be processed in case binding.

The inch/millimeter input switching button 1015 is used to switch the unit of an input numerical value between inches and millimeters. When the user presses the button 1015, the unit can switch from millimeters to inches or from inches to millimeters.

The registered finishing size select button 1021 is used to set a finishing size by selecting it from a list of registered finishing sizes without inputting the numerical values of the width and height. The registration button 1022 is used to register a finishing size. By registering a frequently used finishing size in advance, the user need not input the numerical values of the width and height every time he selects the finishing size.

The setting cancel button 1031 is used to cancel setting of case binding. When the user presses the setting cancel button 1031, the window changes to the entire job combination setup window 800. The "return" button 1032 is used to return to an immediately preceding window (case binding opening direction setup window 900). The "next" button 1033 is used to continue setting of case binding. When the user presses this button, the window changes to a case binding cover feed portion/trimming method setup window 1100. If the user inputs a finishing size which cannot be processed in case binding by the case binding section 300, it is controlled to prevent the user from pressing the "next" button 1033.

Figure 11:
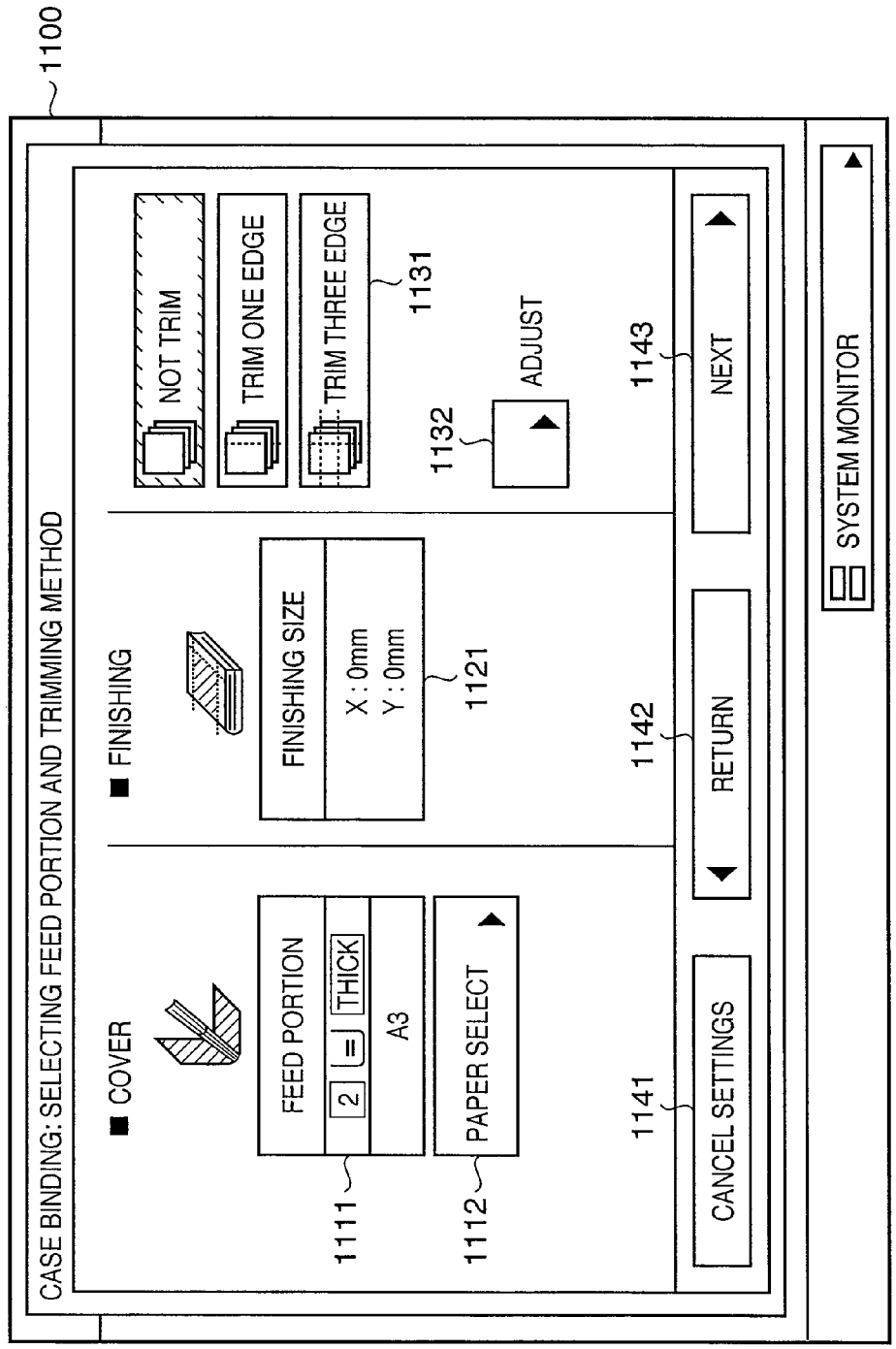
FIG. 11 is a view showing an example of a case binding cover feed portion/trimming method setup window when executing job combination in the embodiment.

FIG. 11 is a view showing an example of a window for setting a case binding cover feed portion and trimming method in the transition of the operation window when executing job combination shown in FIG. 6.

The case binding cover feed portion/trimming method setup window 1100 has a cover feed portion setting button 1112, setting information display portion 1111, finishing size display portion 1121, trimming method setting button 1131, and trimming adjust button 1132. The cover feed portion/trimming method setup window 1100 also has a setting cancel button 1141, "return" button 1142, and "next" button 1143.

The cover feed portion setting button 1112 is used to set a cover feed source. When the user presses the cover feed portion setting button 1112, the window displays feed sources to which covers can be fed. The user sets a cover feed source by selecting a desired one of the displayed feed sources. The setting information display portion 1111 displays the feed tray number of the cover feed source set with the cover feed portion setting button 1112, and a paper size and paper type set for the feed tray.

The finishing size display portion 1121 displays a finishing size set in the case binding finishing size setup window 1000.

The trimming method setting button 1131 is used to set a trimming method. The user selects one of "not trim", "trim one edge", and "trim three edges".

The trimming adjust button 1132 is used to set an adjustment value regarding trimming. The trimming adjust button 1132 allows setting the image position of the body, that of the cover, the trimming angle, and the adjustment value of the cutting position.

The setting cancel button 1141 is used to cancel setting of case binding. When the user presses the setting cancel button 1141, the window changes to the entire job combination setup window 800. The "return" button 1142 is used to return to an immediately preceding window (case binding finishing size setup window 1000). The "next" button 1143 is used to continue setting of case binding. When the user presses this button, the window changes to the case binding cover setup window 1200.

Figure 12:
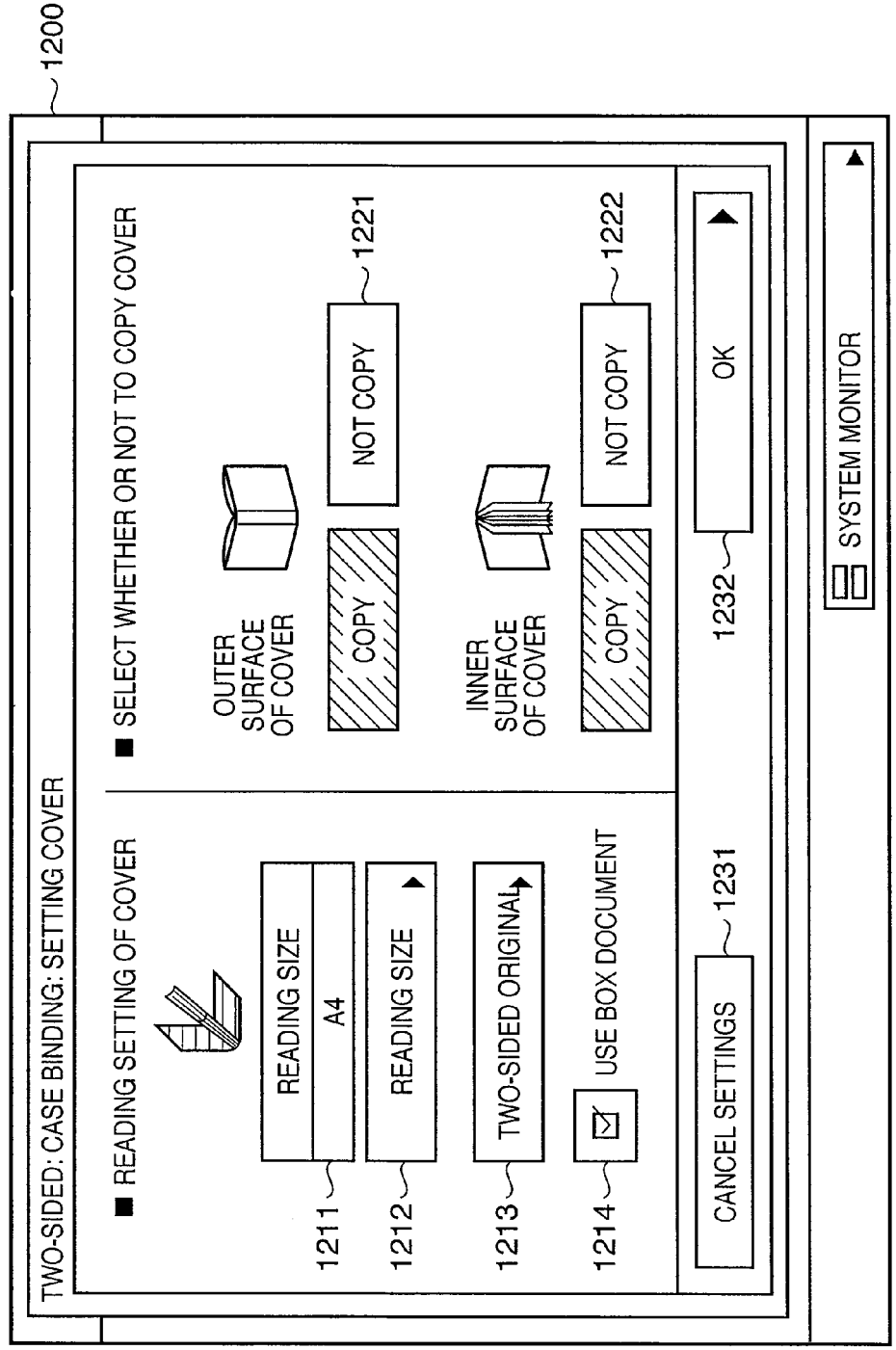
FIG. 12 is a view showing an example of a case binding cover setup window when executing job combination in the embodiment.

FIG. 12 is a view showing an example of the case binding cover setup window 1200 in the transition of the operation window when executing job combination shown in FIG. 6.

A case binding cover setup window 1200 has a cover reading size setting display portion 1211, a cover reading size setting button 1212, a two-sided original setting button 1213, a box document select button 1214, and cover copy setting buttons 1221-1222. The case binding cover setup window 1200 also has a setting cancel button 1231 and OK button 1232.

The reading size setting button 1212 is used to set the size of a cover original to be read. The two-sided original setting button 1213 is used to set reading of a two-sided original. When the user sets reading of a two-sided original, he can select how to open the two-sided original (either horizontal spread or vertical spread). The cover reading setting display portion 1211 displays contents set with the reading size setting button 1212 and two-sided original setting button 1213.

The outer cover surface copy setting button 1221 is used to set whether to copy on the outer surface of a cover. The inner cover surface copy setting button 1222 is used to set whether to copy on the inner surface of a cover. It is controlled to enable selecting only either "copy" or "not copy".

The box document select button 1113 is used to select a cover original from a document stored by the box function. When the user selects the box document select button 1113, contents set with the other setting buttons 1212, 1213, 1221, and 1222 are disabled. The setting cancel button 1231 is used to cancel setting of case binding. When the user presses the setting cancel button 1231, the window changes to the entire job combination setup window 800.

The OK button 1232 is used to enable setting of case binding. When the user presses the OK button 1232, the window changes to the entire job combination setup window 800 while enabling case binding settings made in the windows 900, 1000, 1100, and 1200.

When the user presses the OK button 830 in the entire job combination setup window 800, the window changes to a box number designation window 1500 or cover original reading setup window 1300. At this time, the window changes to a box document designation window 1600 when the box document select button 1214 is selected in the case binding cover setup window 1200, and to the cover original reading setup window 1300 when no box document select button 1214 is selected.

Figure 13:
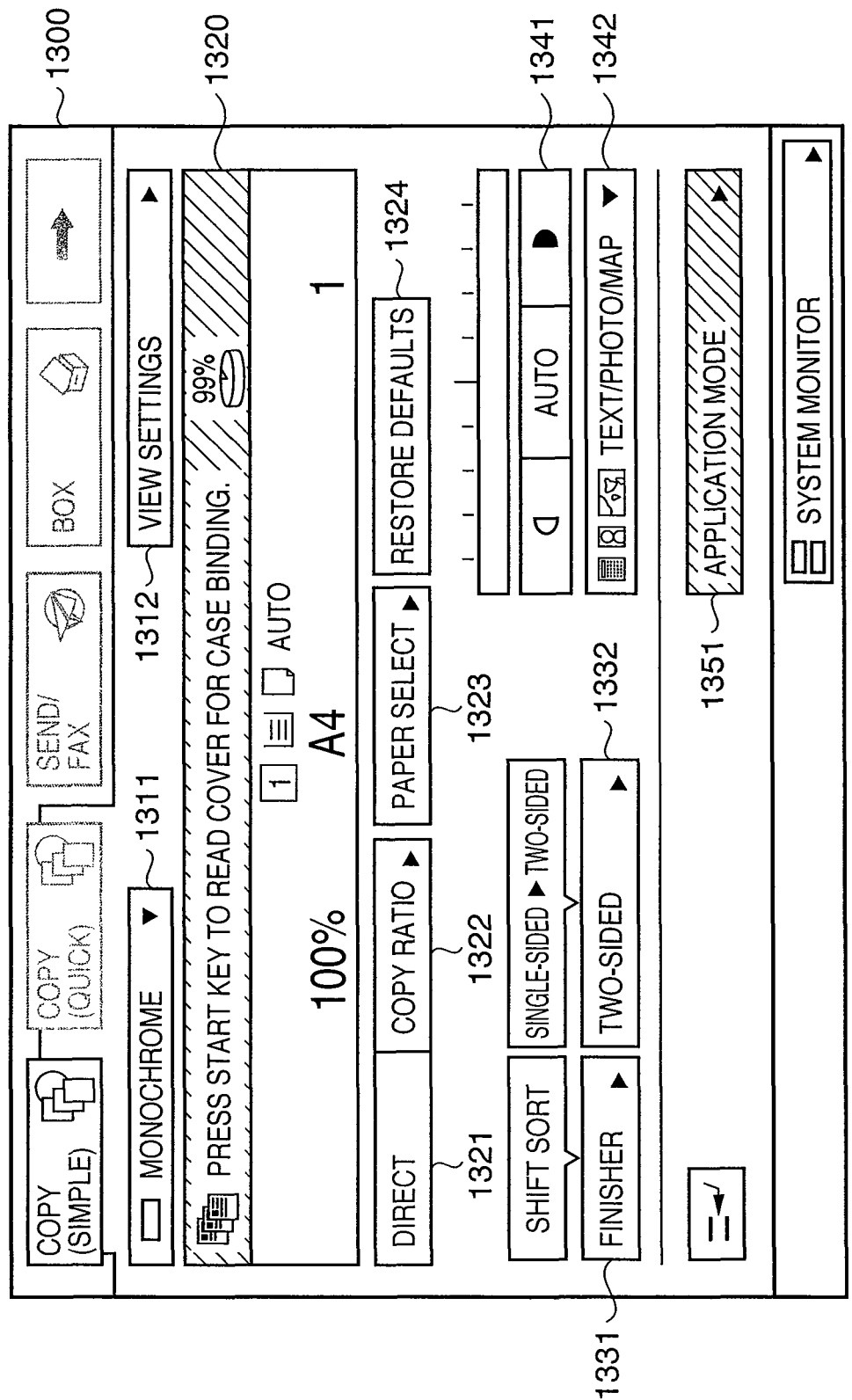
FIG. 13 is a view showing an example of a cover original reading setup window when executing job combination in the embodiment.

FIG. 13 is a view showing an example of the cover original reading setup window in the transition of the operation window when executing job combination shown in FIG. 6.

The cover original reading setup window 1300 has a color mode setting button 1311, a setting check button 1312, a device information/setting information display portion 1320, various reading setting buttons 1321 to 1342, and an application mode setting button 1351.

The color mode setting button 1311 is used to set a color mode in reading. Selectable color modes include "auto select", "full color", and "monochrome". The setting check button 1312 is used to check current setting contents.

The setting initialization button 1324 is used to restore, to predetermined initial values, various settings which can be made in the cover original reading setup window 1300.

The device information/setting information display portion 1320 is identical to the setting information display portion 710 in the initial window 700. The direct button 1321 is identical to the direct button 711, and the copy ratio button 1322 is identical to the copy ratio button 712. The paper select button 1323 is identical to the paper select button 713, the finisher button 1331 is identical to the finisher button 721, and the two-sided button 1332 is identical to the two-sided button 722. The density adjust button 1341 is identical to the density adjust button 741, and the document mode select button 1342 is identical to the document mode select button 742. Note that the finisher is set for an entire job in the entire job combination setup window 800, so it is controlled to prevent the user from setting a finisher in the cover original reading setup window 1300.

The application mode setting button 1351 is used to set various application modes.

When the user makes various settings in the cover original reading setup window 1300 and presses the start key 607, reading of the cover starts, and the window changes to a cover original reading execution window 1400.

Figure 14:
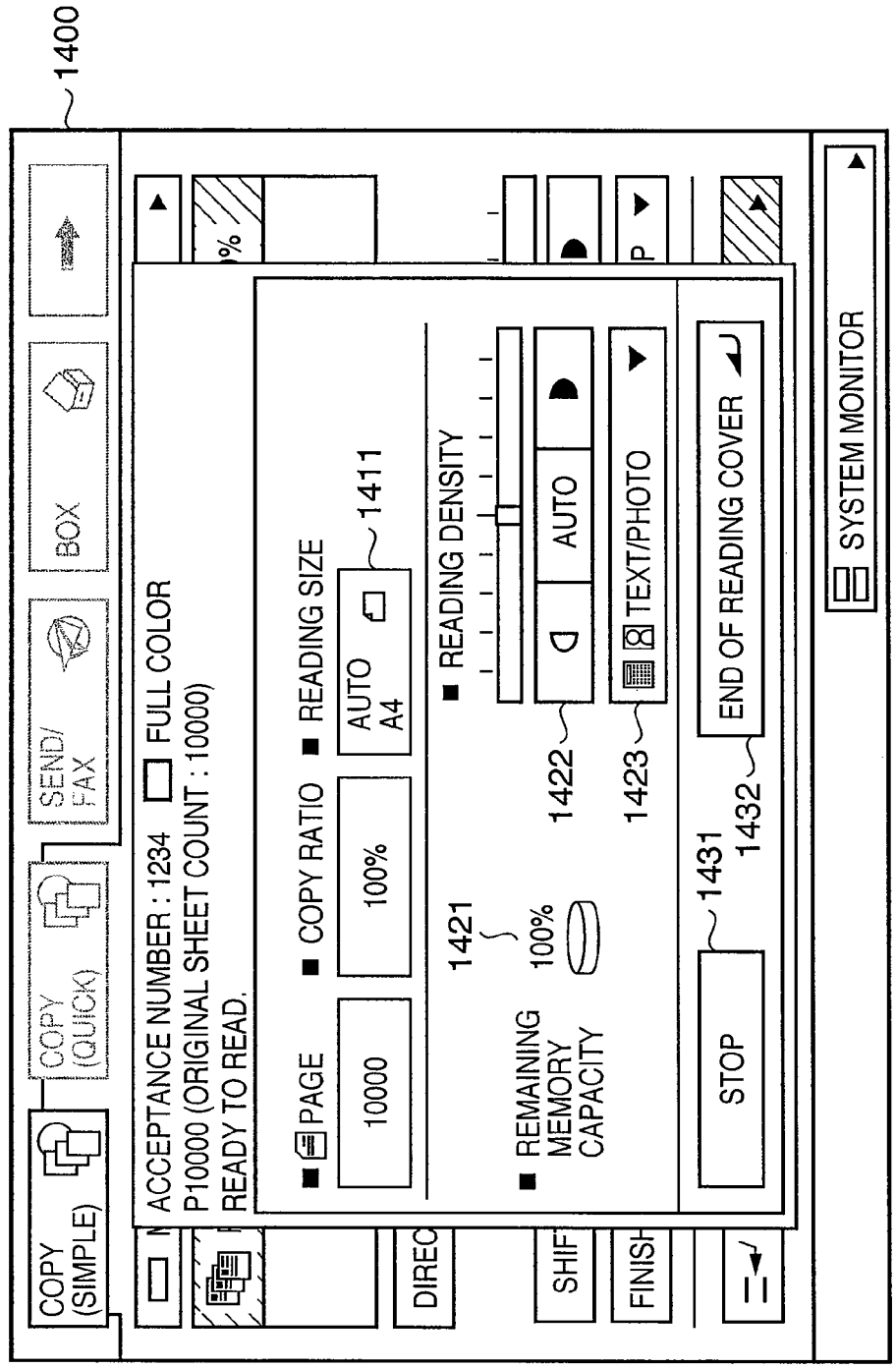
FIG. 14 is a view showing an example of a cover original reading execution window when executing job combination in the embodiment.

FIG. 14 is a view showing an example of the cover original reading execution window in the transition of the operation window when executing job combination shown in FIG. 6.

The cover original reading execution window 1400 has a reading setting display portion 1411, remaining memory capacity display portion 1421, reading density adjust button 1422, document mode select button 1423, stop button 1431, and cover reading end button 1432.

The reading setting display portion 1411 displays the number of original pages to be read, the copy ratio, and the reading size. The remaining memory capacity display portion 1421 displays the remaining memory capacity for storing a document. The reading density adjust button 1422 is used to change the setting of the reading density. The document mode select button 1423 is used to change the document mode.

The stop button 1431 is used to stop reading before completion. The cover reading end button 1432 is used to end reading of a cover original. When the user presses the cover reading end button 1432, the window changes to a bundle check/combination window 1700.

If the number of read original sheets is short in accordance with the setting of whether or not to copy the outer and inner surfaces of the cover in the case binding cover setup window 1200, a popup appears without changing the window, and notifies the user that the number of read original sheets is short. With this display, it is controlled to continue reading the cover original. For example, when "to copy the outer surface of a cover" and "to copy the inner surface of a cover" are set and only one surface of the cover original has been read, no original for the inner surface of the cover is obtained. Thus, a popup to this effect appears. If the number of read original sheets is excessive in accordance with the setting of whether or not to copy the outer and inner surfaces of the cover, reading of the original stops, and the job also stops. For example, when "to copy the outer surface of a cover" and "to copy the inner surface of a cover" are set and three or more surfaces of the cover original have been read, the original reading operation quickly stops, and the job also stops.

Figure 15:
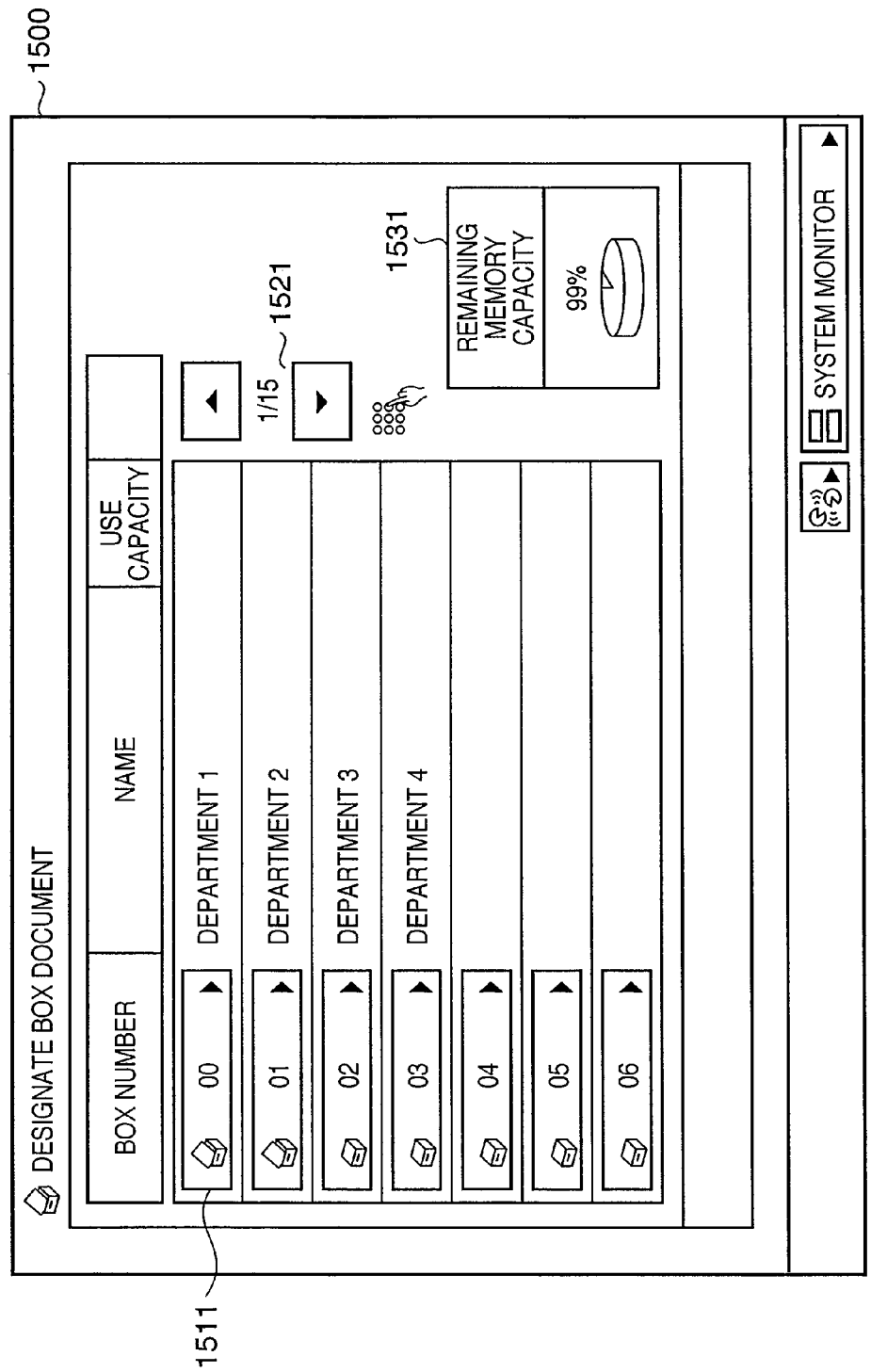
FIG. 15 is a view showing an example of a box number designation window when executing job combination in the embodiment.

FIG. 15 is a view showing an example of the box number designation window in the transition of the operation window when executing job combination shown in FIG. 6.

The box number designation window 1500 has a box number designation button 1511, box number list display update button 1521, and remaining memory capacity display portion 1531. The box number list display update button 1521 is used to display a list other than a currently displayed box number list. The remaining memory capacity display portion 1531 displays a memory capacity available for the box function. The box number designation button 1511 is used to designate the number of a box which stores a target document. A name and use capacity corresponding to each box number are displayed beside the box number designation button 1511. When the user presses the box number designation button 1511, a list of documents stored in a box corresponding to the designated box number is displayed.

FIG. 16 is a view showing an example of a window when the user designates box number 00.

The box document designation window 1600 has a document list display portion 1610, document list display update button 1611, selection cancel button 1612, detailed information display button 1613, image display button 1614, cancel button 1621, and OK button 1622.

The document list display portion 1610 displays documents stored in a box corresponding to the designated box number. The document list display portion 1610 displays the items of the type, document name, paper size, page, and date/time. The document list display portion 1610 allows selecting a target document. The document list display update button 1611 is used to display a list other than a currently displayed document list. The selection cancel button 1612 is used to cancel a selection operation at the document list display portion 1610. The detailed information display button 1613 is used to display detailed information of a selected document. When the user presses the detailed information display button 1613, a window identical to that shown in FIG. 23 appears, and the user can check various pieces of setting information of each document. The image display button 1614 is used to display the image of a selected document. When the user presses the image display button 1614, a window identical to that shown in FIG. 20 appears, and the user can check images in the document page by page.

The cancel button 1621 is used to cancel a box document designation operation. The OK button 1622 is used to read a document selected at the document list display portion 1610 as a bundle to be job-combined. When the user presses the OK button 1622, the window changes to the bundle check/combination window 1700.

If a document which cannot be job-combined owing to contradiction to entire settings is selected in the box number designation window 1500 of FIG. 15, a popup window appears to notify the user that the selected document cannot be job-combined.

Alternatively, it is controlled to gray out a document which cannot be job-combined and prevent the user from selecting it. At this time, whether a document can be job-combined is determined by comparing entire settings with attributes and settings associated with each document.

Figure 17:
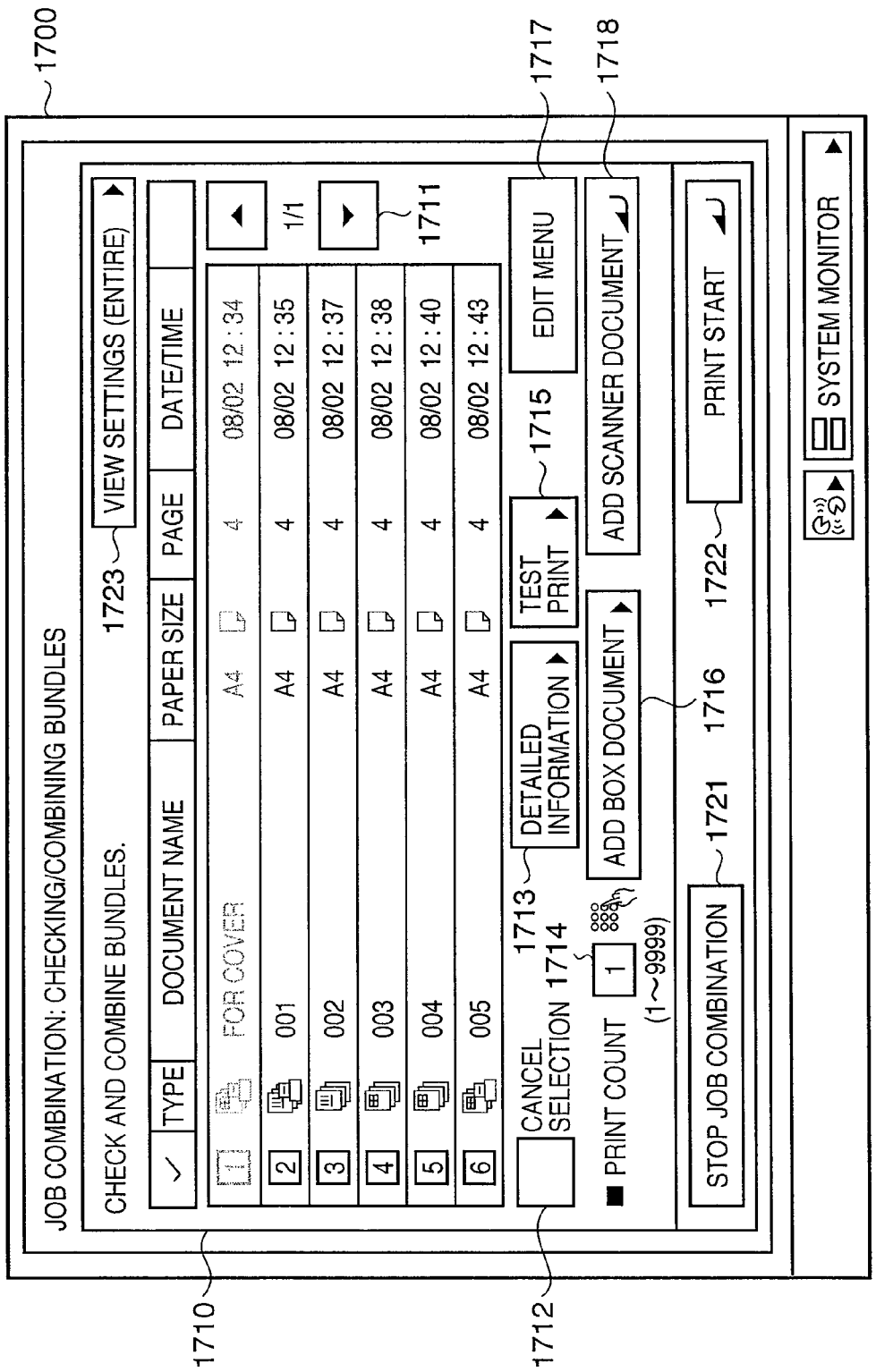
FIG. 17 is a view showing an example of a bundle check/combination window when executing job combination in the embodiment.

FIG. 17 is a view showing an example of the bundle check/combination window in the transition of the operation window when executing job combination shown in FIG. 6. FIG. 17 shows an operation window best representing the feature of the embodiment. The feature of the embodiment will be explained in detail with reference to FIG. 17.

The bundle check/combination window 1700 has an entire job combination setting check button 1723, bundle list display portion 1710, bundle list display update button 1711, selection cancel button 1712, detailed information display button 1713, and print count setting display portion 1714. The bundle check/combination window 1700 also has a test print execution button 1715, box document add button 1716, edit menu button 1717, scanned document add button 1718, job combination stop button 1721, and print start button 1722.

Figure 24:
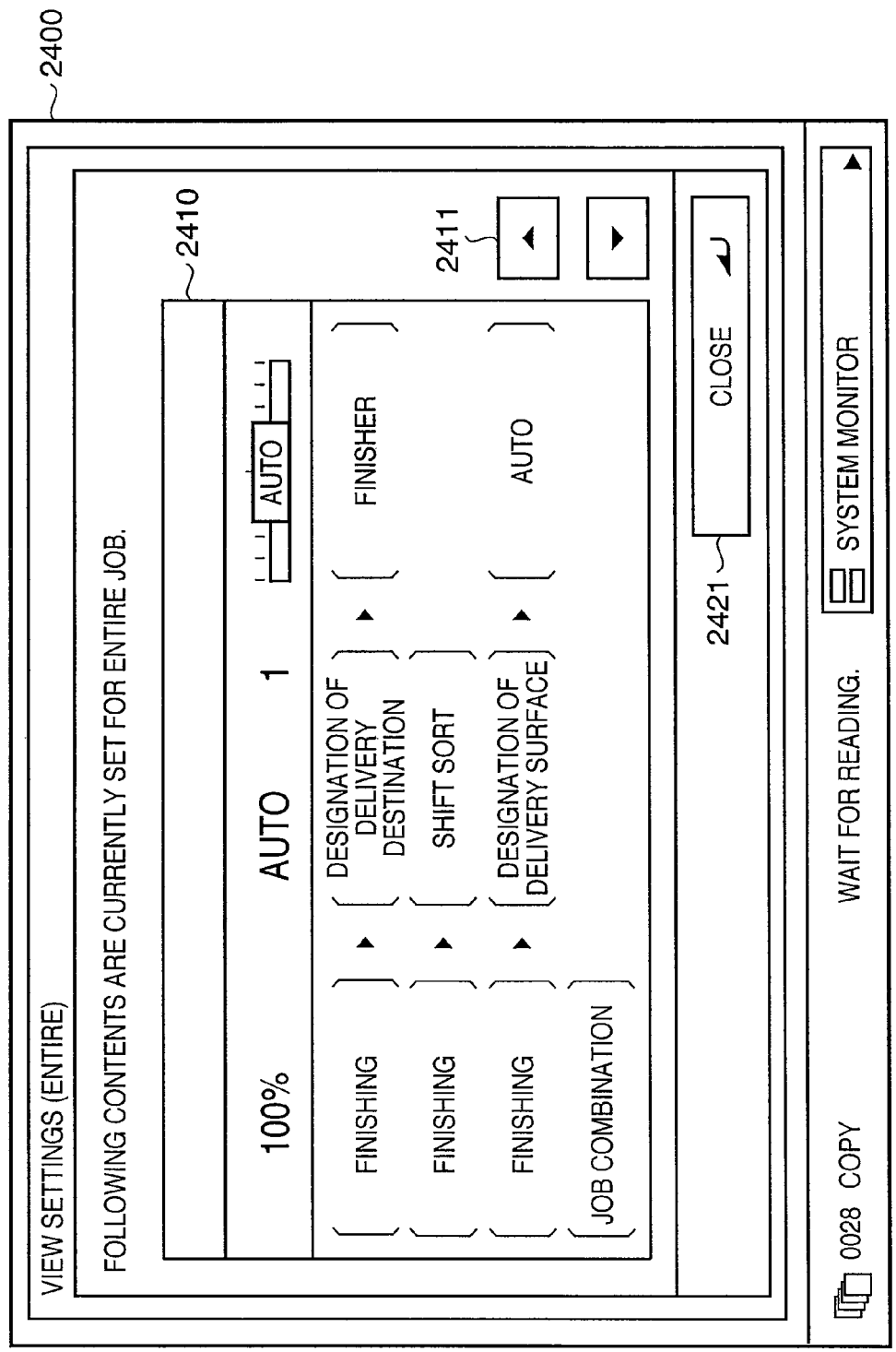
FIG. 24 is a view showing an example of an entire job combination setting check window when executing job combination in the embodiment.

The entire job combination setting check button 1723 is used to check entire settings. When the user presses the entire job combination setting check button 1723, an entire job combination setting check window 2400 as shown in FIG. 24 appears.

The bundle list display portion 1710 in FIG. 17 displays a list of bundles (documents) to be job-combined. The bundle list display portion 1710 displays the items of the type, document name, paper size, page, and date/time. Numbers (embraced with squares) displayed at the leftmost portion of the list represent the combination order. A document whose number is not displayed is not selected as a combination target.

FIG. 27 is a view showing an output result when jobs are combined in the order displayed in FIG. 17. More specifically, a document for a "cover" is output as a case binding cover original in accordance with the display order in the list of FIG. 17, and documents "001" to "005" are output as a body.

FIG. 28 is a view showing an example of an output result when the combination order changes. When the user selects a document for a "cover" as the top, and then selects documents "003", "001", "005", "002", and "004", the output order changes to one as shown in FIG. 28.

Figure 29:
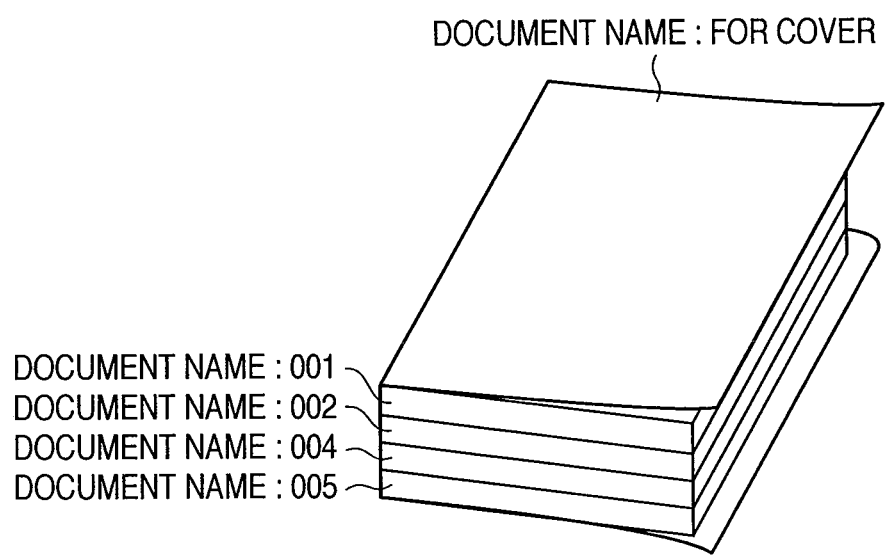
FIG. 29 is a view showing an example of an output result when executing job combination in the embodiment.

FIG. 29 is a view showing an example of an output result when selection of a document to be combined is canceled. When the user cancels selection of document "003", document "003" is not output, and output materials are generated by combining the remaining selected documents, as shown in FIG. 29.

When case binding is set as an entire setting at the bundle list display portion 1710 of FIG. 17 (i.e., case binding is selected in the window of FIG. 8), it is controlled that a document serving as a cover is always combined as the top document and cancellation of selection of the cover original is inhibited. More specifically, the job controller 5 controls to inhibit a cover original serving as a predetermined job corresponding to case binding, which is a predetermined finishing process, among a plurality of jobs from being excluded from case binding cover targets. In addition, the job controller 5 controls to inhibit even change of the combination order of the cover original. In the example of FIG. 17, the number (embraced with a square) of a document for a "cover" in the list is always 1, and grayed out to inhibit cancellation of selection.

The bundle list display update button 1711 is used to display a list other than a currently displayed document list.

The selection cancel button 1712 is used to cancel selection of all documents to be combined. When the user presses the selection cancel button 1712 to cancel selection of all documents, the selection cancel button 1712 changes to a select-all key. The select-all key is used to select all documents displayed at the bundle list display portion 1710 as combination targets. When case binding is set as an entire setting, selection of a document serving as a cover is not canceled even upon pressing the selection cancel button 1712, and selection of all documents except the document serving as a cover is canceled.

Figure 23:
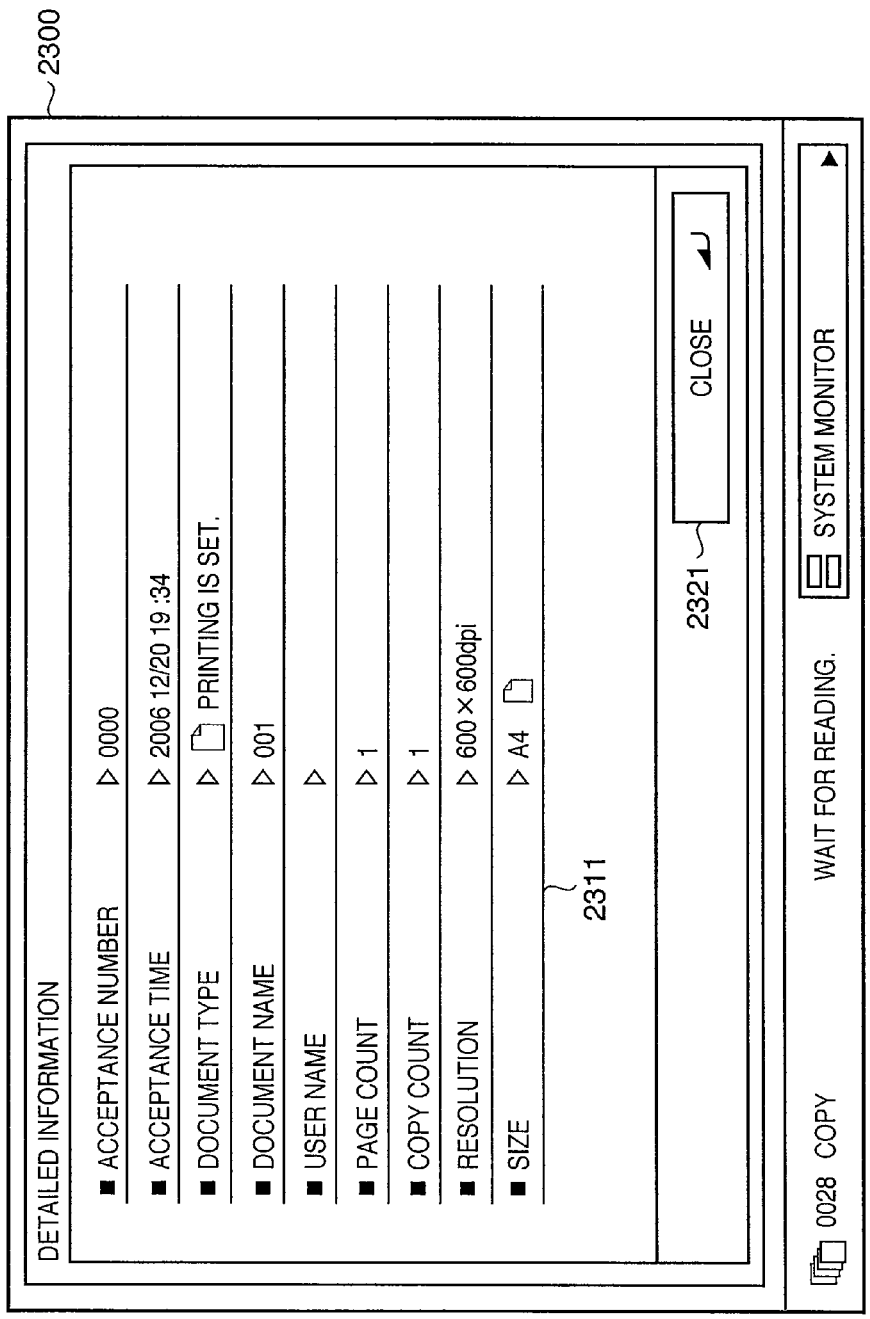
FIG. 23 is a view showing an example of a single-bundle setting check window when executing job combination in the embodiment.

The detailed information display button 1713 is used to display detailed information of each document displayed at the bundle list display portion 1710. When the user presses the detailed information display button 1713, the window changes to a single-bundle setting check window 2300 as shown in FIG. 23.

The print count setting display portion 1714 displays a set print count. The user can input a print count with the ten-key pad 601.

The test print execution button 1715 is used to perform test print. When the user presses the test print execution button 1715, the window changes to a test print execution window 2500 shown in FIG. 25A, prompting him to execute test print.

Figure 20:
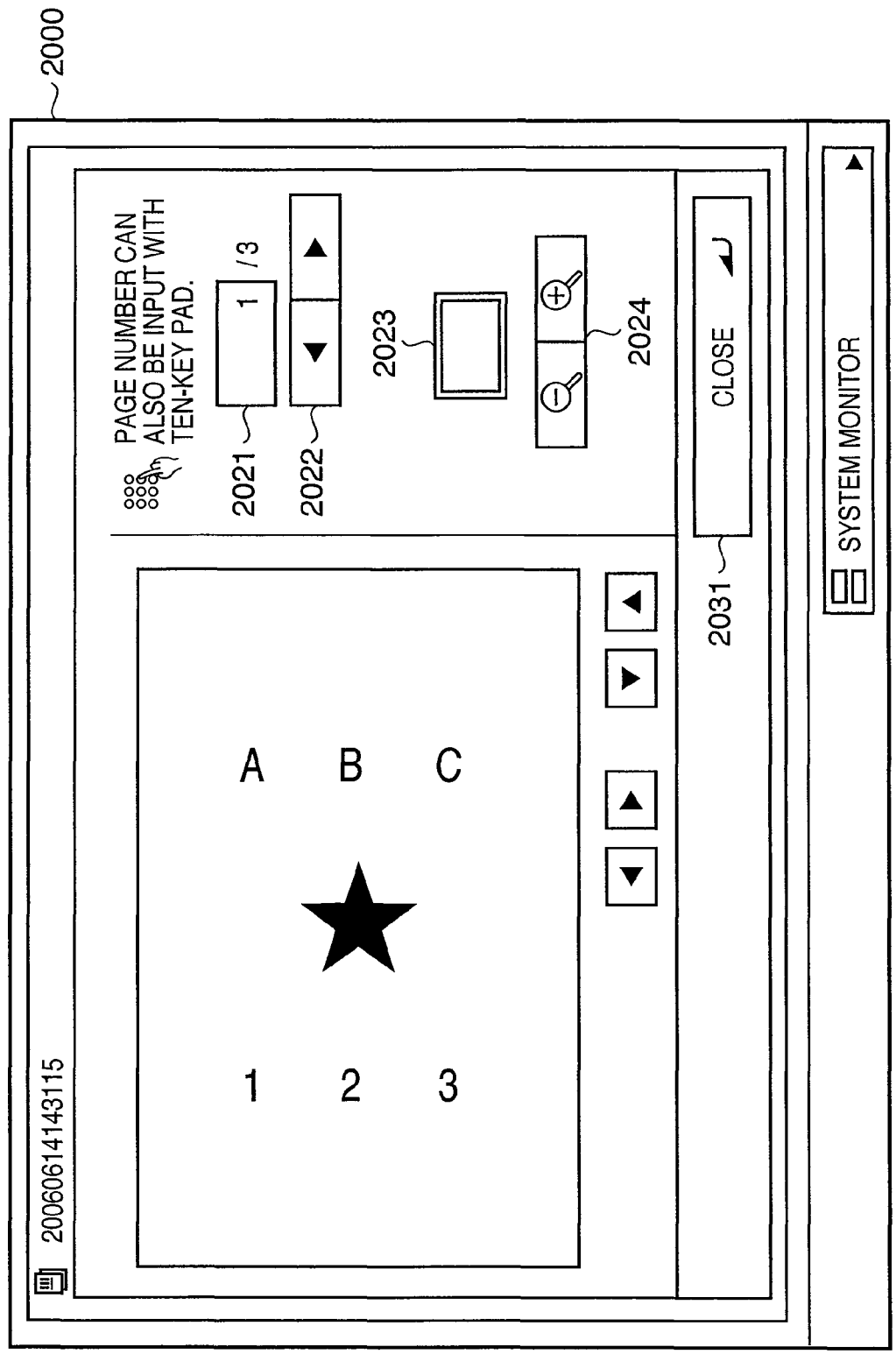
FIG. 20 is a view showing an example of an image display window when executing job combination in the embodiment.

The edit menu button 1717 is used to edit each document displayed at the bundle list display portion 1710. When the user presses the edit menu button 1717, an image display button, page erase button, and bundle erase button are displayed (none are shown). The image display button is used to display an image for each page in order to check the contents of the document. The window changes to an image display window 2000 as shown in FIG. 20.

Figure 22:
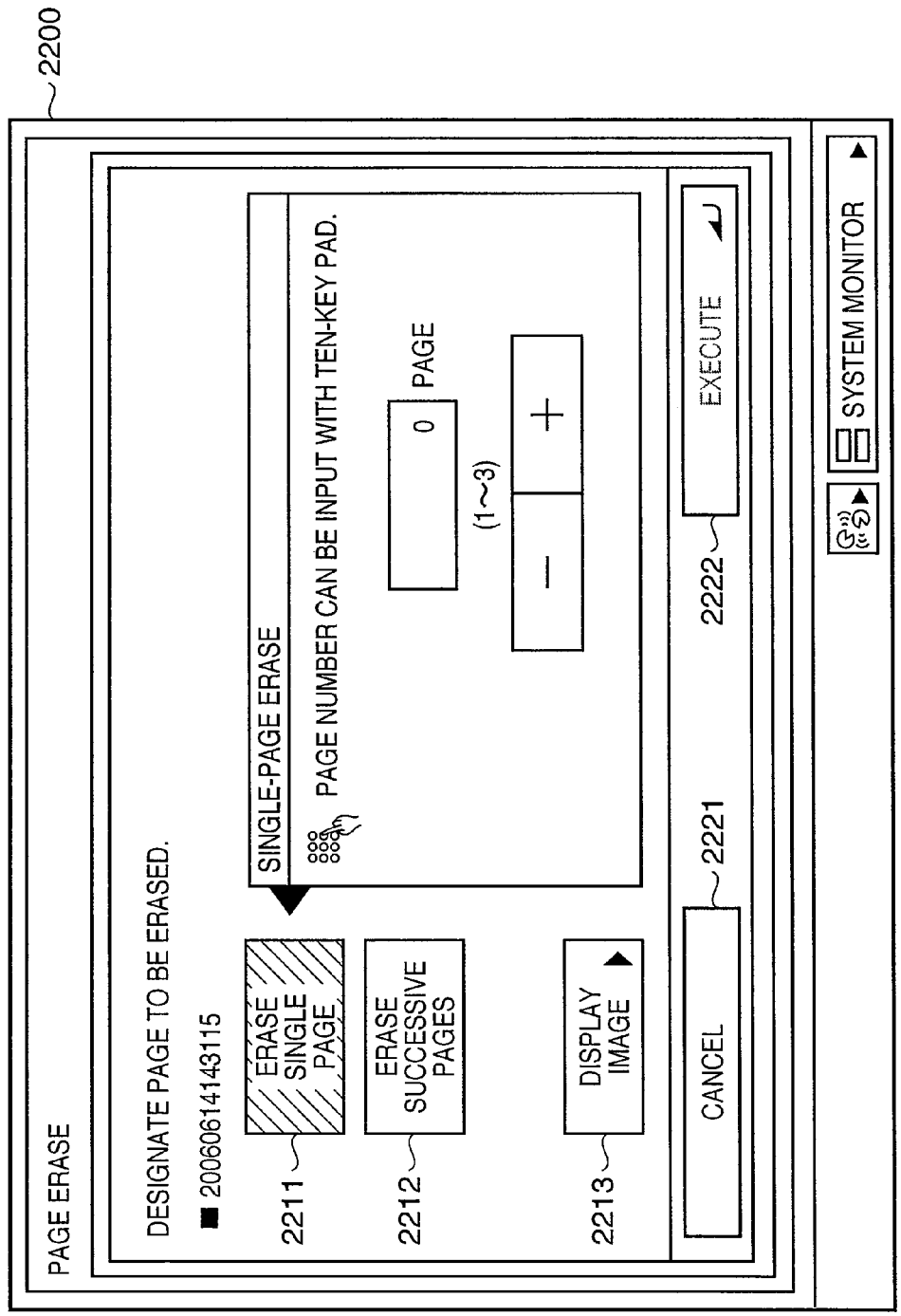
FIG. 22 is a view showing an example of a page erase window when executing job combination in the embodiment.

The page erase button is used to erase the page of a selected document. The window changes to a page erase window 2200 as shown in FIG. 22. In response to the bundle erase button, the window changes to a bundle erase window 2100 as shown in FIG. 21. The user erases a document (bundle) from the list displayed at the bundle list display portion 1710. When a document added from a box is erased among documents at the bundle list display portion 1710, the added document is erased not from the box, but only from the list displayed at the bundle list display portion 1710.

The box document add button 1716 is used to add a document stored by the box function as a document to be combined. When the user presses the box document add button 1716, the window changes to the box number designation window 1500 and box document designation window 1600 to add a document. The added document is displayed at the bundle list display portion 1710.

The scanned document add button 1718 is used to read a document to be combined from a scanner and add it. When the user presses the scanned document add button 1718, the window changes to a body original bundle reading setup window 1800. After scanning is executed, the scanned document is added. The added document is displayed at the bundle list display portion 1710.

The job combination stop button 1721 is used to stop execution of job combination. When job combination stops, all scanned documents displayed at the bundle list display portion 1710 are erased. Job combination stops without erasing, from the box, a box document displayed at the bundle list display portion 1710.

Figure 26:
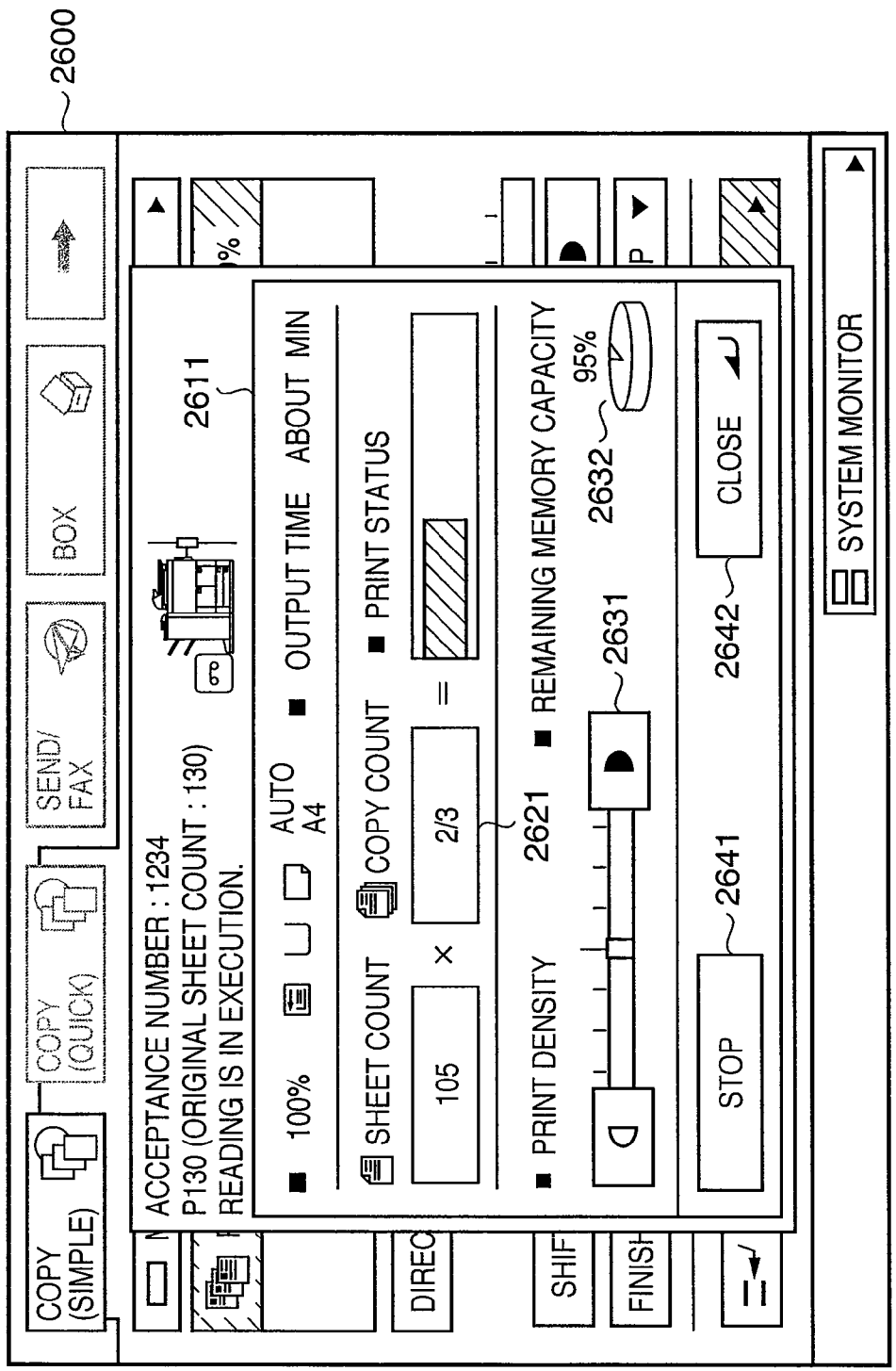
FIG. 26 is a view showing an example of a print execution window when executing job combination in the embodiment.

The print start button 1722 is used to execute job combination of documents selected at the bundle list display portion 1710. When the user presses the print start button 1722 to execute job combination, the window changes to a print execution window 2600 as shown in FIG. 26.

Figure 18:
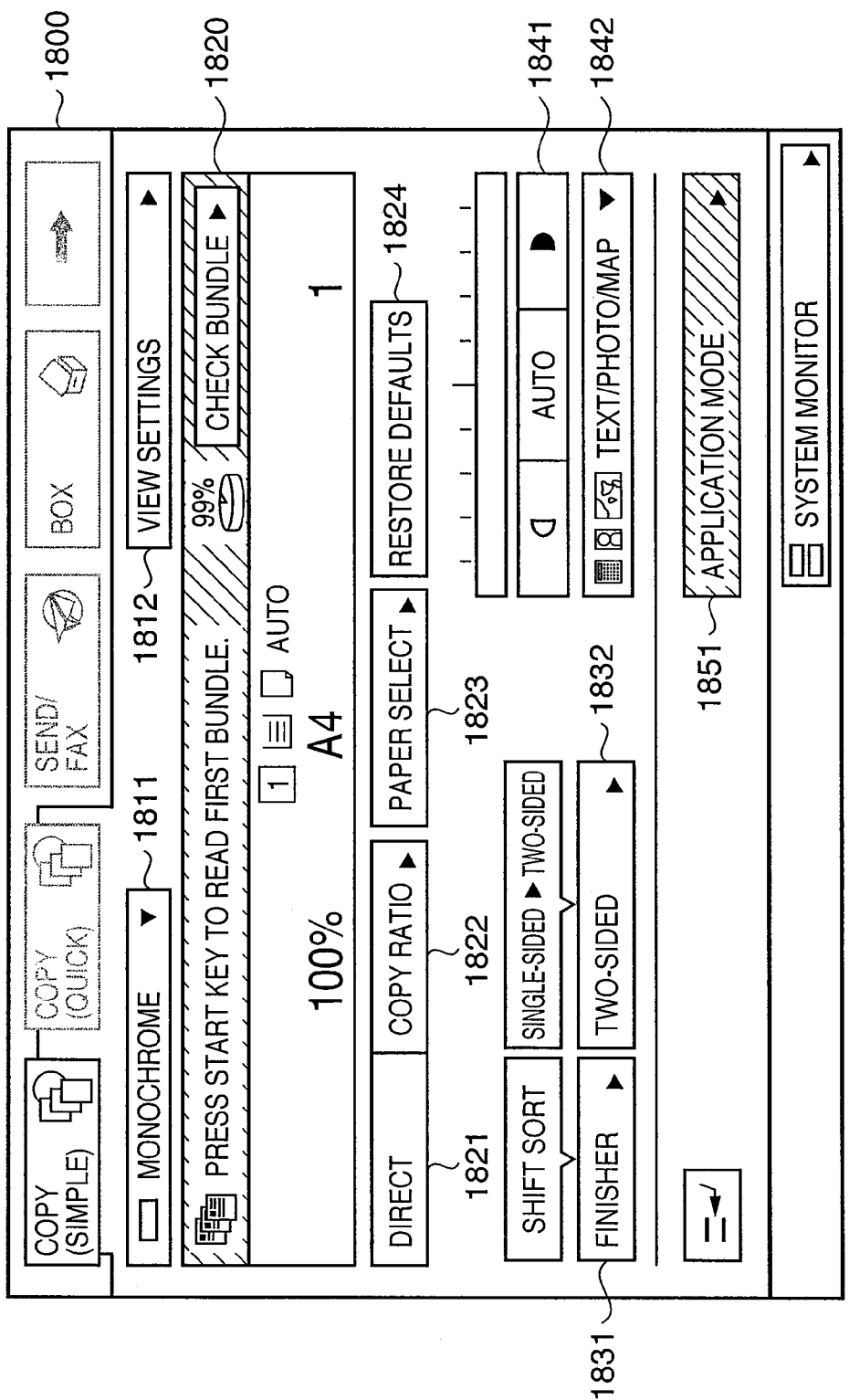
FIG. 18 is a view showing an example of a body original bundle reading setup window when executing job combination in the embodiment.

FIG. 18 is a view showing an example of the body original bundle reading setup window in the transition of the operation window when executing job combination shown in FIG. 6.

The body original bundle reading setup window 1800 has a color mode setting button 1811, a setting check button 1812, a device information/setting information display portion 1820, various reading setting buttons 1821 to 1842, and an application mode setting button 1851.

The color mode setting button 1811 is identical to the color mode setting button 1311 in the cover original reading setup window 1300. The setting check button 1812 is identical to the setting check button 1312, and the device information/setting information display portion 1820 is identical to the setting information display portion 1320. The direct button 1821 is identical to the direct button 1321, the copy ratio button 1822 is identical to the copy ratio button 1322, the paper select button 1823 is identical to the paper select button 1323, and the setting initialization button 1824 is identical to the setting initialization button 1324. The finisher button 1831 is identical to the finisher button 1331, the two-sided button 1832 is identical to the two-sided button 1332, the density adjust button 1841 is identical to the density adjust button 1341, and the document mode select button 1842 is identical to the document mode select button 1342. The application mode setting button 1851 is identical to the application mode setting button 1351.

In the body original bundle reading setup window 1800, contents settable with the reading setting buttons 1821 to 1842 are limited to prevent reading of a body original inconsistent with entire settings. For example, when case binding is set as an entire setting, it is controlled to inhibit selecting, from the window, a paper size not approved for a body original.

When the user makes various settings in the body original bundle reading setup window 1800 and presses the start key 607, reading of the body original bundle starts, and the window changes to a body original bundle reading execution window 1900.

Figure 19:
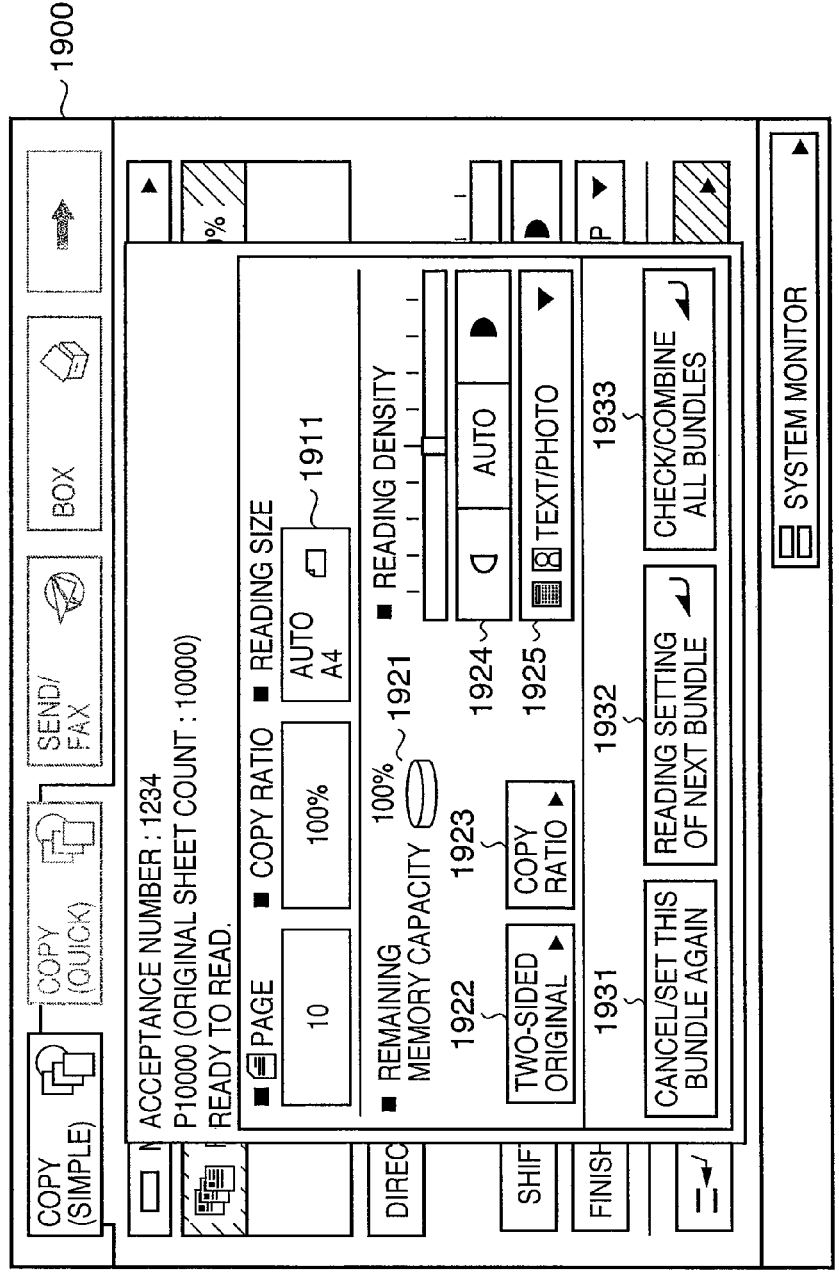
FIG. 19 is a view showing an example of a body original bundle reading execution window when executing job combination in the embodiment.

FIG. 19 is a view showing an example of the body original bundle reading execution window in the transition of the operation window when executing job combination shown in FIG. 6.

The body original bundle reading execution window 1900 has a reading setting display portion 1911, remaining memory capacity display portion 1921, two-sided original setting button 1922, copy ratio setting button 1923, reading density adjust button 1924, and document mode select button 1925. The body original bundle reading execution window 1900 also has a bundle cancel button 1931, next bundle reading execution button 1932, and bundle check/combination button 1933.

The reading setting display portion 1911 is identical to the reading setting display portion 1411 in the cover original reading execution window 1400. The remaining memory capacity display portion 1921 is identical to the remaining memory capacity display portion 1421. The reading density adjust button 1924 is identical to the reading density adjust button 1422. The document mode select button 1925 is identical to the document mode select button 1423. The two-sided original setting button 1922 is used to change the setting of a two-sided original. The copy ratio setting button 1923 is used to change the setting value of the copy ratio.

The bundle cancel button 1931 is used to set not to register a read original as a bundle to be job-combined. The next bundle reading execution button 1932 is used to register a read original as a bundle to be job-combined, and make the reading setting of the next original bundle. The bundle check/combination button 1933 is used to register a read document as a bundle to be job-combined, and change the window to the bundle check/combination window 1700.

FIG. 20 is a view showing an example of the image display window in the transition of the operation window when executing job combination shown in FIG. 6.

The image display window 2000 has an image display portion 2011, image display portion moving button 2012, page number display portion 2021, display page designation button 2022, image display view 2023, enlargement/reduction display designation button 2024, and "close" button 2031.

The image display portion 2011 displays the image of an arbitrary page of a selected document. A page displayed at the image display portion 2011 can be designated with the display page designation button 2022. The page number display portion 2021 displays a currently displayed page number. The image display view 2023 represents a portion of an actual image that is displayed at the image display portion 2011. The enlargement/reduction display designation button 2024 is used to enlarge or reduce an image displayed at the image display portion 2011. The image display portion moving button 2012 is used to move the display portion of an image displayed at the image display portion 2011.

The "close" button 2031 is used to stop image display. When the user presses this button, the window changes to the bundle check/combination window 1700 or box document designation window 1600.

FIG. 21 is a view showing an example of the bundle erase window in the transition of the operation window when executing job combination shown in FIG. 6.

The bundle erase window 2100 has a bundle list display portion 2110, bundle list display update button 2112, select-all button 2111, cancel button 2121, and OK button 2122.

The bundle list display portion 2110 is used to display a list of erasable bundles. The bundle list display portion 2110 allows selecting a bundle to be erased. The bundle list display update button 2112 is used to display a list other than a currently displayed bundle list. The select-all button 2111 is used to select all bundles in the list.

The OK button 2122 is used to erase a bundle. When the user presses the OK button 2122 while selecting a bundle at the bundle list display portion 2110, the selected bundle is erased. The cancel button 2121 is used to stop erasing a bundle. When the user presses the cancel button 2121 or OK button 2122, the window changes to the bundle check/combination window 1700.

FIG. 22 is a view showing an example of the page erase window in the transition of the operation window when executing job combination shown in FIG. 6.

The page erase window 2200 has a single page erase button 2211, successive page erase button 2212, image display button 2213, erase page display portion 2214, erase page designation button 2215, cancel button 2221, and execution button 2222.

The single page erase button 2211 is used to designate one page to be erased and erase it. The successive page erase button 2212 is used to erase the nth to Nth successive pages at once. It is controlled to select only either the single page erase button 2211 or successive page erase button 2212. FIG. 22 shows an example in which the single page erase button 2211 is selected.

The erase page designation button 2215 is used to designate a page to be erased. The erase page display portion 2214 displays a designated page number. If the user presses the execution button 2222 at this time, the page displayed at the erase page display portion 2214 is erased. If the user presses the cancel button 2221, the page erase operation stops.

The image display button 2213 is used to display an image, and a window identical to that shown in FIG. 20 appears. The user can erase an intended page while checking the image.

FIG. 23 is a view showing an example of the single-bundle setting check window in the transition of the operation window when executing job combination shown in FIG. 6.

The single-bundle setting check window 2300 has a bundle setting information display portion 2311 and "close" button 2321. The bundle setting information display portion 2311 displays information on the acceptance number, acceptance time, document type, document name, user name, page count, copy count, and size set for a target bundle. The "close" button 2321 is used to close the single-bundle setting check window 2300.

FIG. 24 is a view showing an example of the entire job combination setting check window in the transition of the operation window when executing job combination shown in FIG. 6.

The entire job combination setting check window 2400 has an entire setting display portion 2410, slide button 2411, and "close" button 2421. The entire setting display portion 2410 displays contents set as entire settings of job combination. The slide button 2411 is used to slide display contents when the entire setting display portion 2410 cannot display all setting items. The "close" button 2421 is used to close the entire job combination setting check window 2400.

FIGS. 25A and 25B are views showing an example of the test print execution window in the transition of the operation window when executing job combination shown in FIG. 6.

When the user presses the test print execution button 1715 in the bundle check/combination window 1700, the test print execution window 2500 shown in FIG. 25A appears. The test print execution window 2500 has a bundle test print execution button 2511, entire job combination test print execution button 2512, and "close" button 2521.

The "close" button 2521 is used to stop test print and close the print execution window 2500. The bundle test print execution button 2511 is used to test-print only a bundle selected at the bundle list display portion 1710. At this time, the entire settings of job combination are not enabled, and a selected bundle is printed based on only its setting information. The job combination test print execution button 2512 is used to test-print combined jobs.

After executing test print, the window changes to a test print execution window 2550 shown in FIG. 25B. The test print execution window 2550 has a display portion 2561 for displaying the page count and copy count of a bundle and the print status, a print density change button 2571, and a stop button 2581 for stopping test print. Upon completion of executing test print, the test print execution window 2550 changes to the bundle check/combination window 1700.

FIG. 26 is a view showing an example of the print execution window in the transition of the operation window when executing job combination shown in FIG. 6.

The print execution window 2600 has a display portion 2611 for displaying the setting information and estimated output time of a job, a display portion 2621 for displaying the print count, copy count, and print status, a density adjust button 2631 for changing the print density setting, and a remaining memory capacity display portion 2632. The print execution window 2600 also has a stop button 2641 and "close" button 2642. The stop button 2641 is used to stop execution of job combination. The "close" button 2642 is used to close the print execution window 2600. After the end of a job, the print execution window 2600 disappears.

Figure 30:
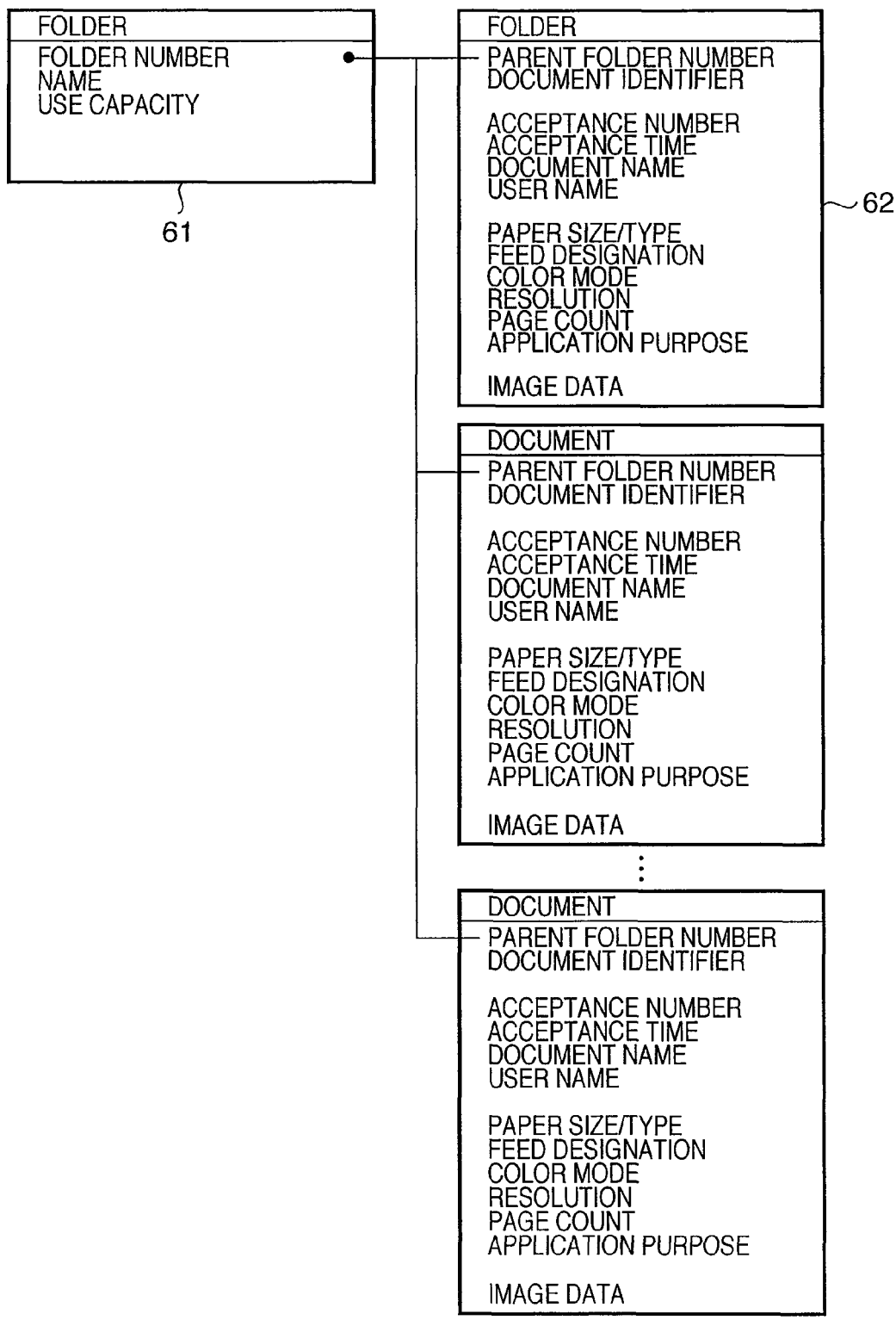
FIG. 30 is a view showing an example of the data structure of a document stored by the box function and an example of the data structure of a scanned document added by job combination.

FIG. 30 is a view showing the data structure of a document stored by the box function and that of a scanned document added by job combination.

A folder 61 and document 62 take a hierarchical data structure in which a plurality of documents belong to a folder.

The folder 61 holds the folder number, name, and use capacity. The folder number is used to identify a box, and is displayed as a box number on the box number designation button 1511 in the box number designation window 1500. In addition, a job combination-specific folder is separately prepared, and stores a scanned document to be job-combined. The name is a folder name, and is changeable to an arbitrary name. The name is displayed as a name corresponding to each box number in the box number designation window 1500. The use capacity represents an HDD capacity used by a target folder, and is displayed as a use capacity corresponding to each box number in the box number designation window 1500.

The document 62 holds the parent folder number, various document attributes, various settings, and image data. The document 62 is one document in the list displayed in the box document designation window 1600 or bundle check/combination window 1700.

The parent folder number is information representing a folder which stores a target document. The document identifier has a value for identifying each document. The acceptance number is applied upon inputting a job, and the time when a job has been received is stored as the acceptance time. The document name is displayed as that of each document (bundle) in the box document designation window 1600 and bundle check/combination window 1700. The user name is the name of a user who has input a job.

Various document settings include the settings of the paper size/type, feed source, color mode, resolution, page count, and application purpose. The paper size/type represents the size and type of paper used for a document. The feed source represents the feed tray number of a feed source. The color mode represents whether a document is color or monochrome. The resolution represents the resolution of image data of a document. The page count represents the page count of image data.

The paper size/type is displayed as the paper size item in the document (bundle) list in the box document designation window 1600 or bundle check/combination window 1700. The page is displayed as the page item, and the acceptance time is displayed as the date/time item.

The application purpose is information for identifying whether the document serves as a case binding cover or body. For example, when a cover original is read as a scanned document via the cover original reading execution window 1400, a value representing a "case binding cover" is stored as an application purpose. When a body original is read via the body original reading execution window 1900, a value representing a "case binding body" is stored as an application purpose.

As image data, image data of all the pages of a document are stored in an image format such as JPEG or JBIG.

The preferred embodiment of the present invention has been described. A concrete example of executing job combination and executing a case binding process as a predetermined finishing process has been explained in the above-described embodiment. However, the present invention is not limited to this, and is also applicable to another finishing process. For example, the present invention is also applicable to a finishing process of setting interleaving paper for separating an original bundle from the next one. In the above-described embodiment, this process can be achieved by selecting the interleaving paper button 812 in FIG. 8. Further, the present invention is similarly applicable to a cover/sheet insertion mode selected as an application mode.

The controller unit 510 determines whether print data is specific type of print data serving as cover print data or a plurality of unspecific print data serving as body print data when performing a predetermined type of postpress such as a case binding process or cover insertion process. In this determination, the controller unit 510 prompts the user to input an explicit instruction via the UI unit prior to storing, in the HDD 14, a plurality of print data to be job-combined. The controller unit 510 utilizes this input information. However, a configuration other than this determination method is also available.

For example, the printing apparatus is configured to store print data serving as the specific type of print data in the HDD 14 at a predetermined storage timing such as the start or end timing when storing, in the HDD 14, a plurality of document data to be combined and printed. The UI unit is controlled to display an identifier associated with the print data at a predetermined display position such as the top or bottom of the document selection list, as shown in FIG. 17.

The controller unit 510 can determine, in accordance with a predetermined rule regarding the storage process and display process without interpreting the contents of print data, print data corresponding to a specific type of print data among the selection candidates of print data to be combined. This can reduce the load on the controller and increase the efficiency.

In this configuration, as the specific type of print data, the printing apparatus uses print data stored in the HDD 14 at a predetermined storage timing such as the start or end timing out of a plurality of document data to be combined and printed. As the unspecific type of print data in a job combination process requiring the predetermined type of postpress, the printing apparatus uses the remaining print data which are stored in the HDD 14 sequentially to the predetermined print data.

In this configuration, assume that the user issues a request via the UI window in FIG. 8 to execute the above-mentioned predetermined type of postpress such as case binding or cover/sheet insertion. In this case, the controller unit 510 controls to inhibit print data whose identifier is displayed at a predetermined position in the document selection list from being excluded from selection targets in a combination process requiring the predetermined type of postpress. In the example of FIG. 17, print data whose identifier is displayed at the top of the list is the specific type of print data inhibited from being excluded from selection targets in the predetermined type of postpress. To the contrary, print data corresponding to the second and subsequent identifiers in the list of FIG. 17 are the unspecific type of print data permitted to be excluded from selection targets in the combination process requiring the predetermined type of postpress.

As described above, when the predetermined type of postpress is used, the controller unit 510 controls to prevent creation of combined printed materials by the printing apparatus without using print data whose identifier is displayed at a predetermined position in the list. The controller unit 510 also controls not to accept a request from the user to change the print order of the print data corresponding to the predetermined identifier.

In contrast, the controller unit 510 controls to allow the user to exclude, from combination printing targets, arbitrary one of print data corresponding to identifiers (second to sixth selection candidates in the list in the example of FIG. 17) different from the predetermined identifier in the list. Further, the controller unit 510 controls the UI unit to allow the user to arbitrarily change the print order of the print data corresponding to the identifiers different from the predetermined identifier in job combination printing.

In this configuration, assume that, prior to displaying the list in FIG. 17, the printing system 500 accepts a request from the user via the UI in FIG. 8 to execute an unpredetermined type of postpress which is not the predetermined type of postpress. For example, the printing system 500 accepts an instruction to execute an unpredetermined type of postpress such as stapling or sort with the key 810.

Even in this case, the controller unit 510 controls to be able to display, via the UI unit, the list in FIG. 17 which allows the user to input various instructions to print data to be job-combined after the printing system 500 accepts a request to execute the unpredetermined type of postpress.

Assume that the user selects the unpredetermined type of postpress. In this case, the controller unit 510 controls to permit accepting a request from the user to exclude, from combination printing targets, print data whose identifier is displayed at a predetermined position in the list of FIG. 17. When performing the unpredetermined type of postpress, the controller unit 510 controls the printing apparatus to execute combination printing in accordance with an instruction from the user without using, as data to be combined and printed, print data whose identifier is displayed at the top of the list in FIG. 17. Even in this case, the controller unit 510 permits accepting a request from the user to exclude print data corresponding to the second and subsequent identifiers in the list of FIG. 17 from selection targets in the combination printing process requiring the unpredetermined type of postpress.

In this manner, when the unpredetermined type of postpress is used, the controller unit 510 controls to permit creation of combined printed materials by the printing apparatus without using print data whose identifier is displayed at a predetermined position in the list. The controller unit 510 also controls to permit accepting a request from the user to change the print order of the print data corresponding to the predetermined identifier in job combination printing. Even in this case, the controller unit 510 controls the UI unit so that the user can arbitrarily change the print order of a plurality of print data corresponding to identifiers different from the predetermined identifier in job combination printing.

The above-described configuration obviates the need to create or prepare different document selection windows for a case where a predetermined type of postpress is done and a case where an unpredetermined type of postpress is done. This configuration can reduce the load on the apparatus. Further, this configuration does not improperly present many types of complicated operation windows to the user, and can provide a user-friendly operation environment where the user is free from confusion.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention can be implemented by a computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-112300, filed Apr. 20, 2007, which is hereby incorporated by reference herein in its entirety.

What is claimed is:

1. A printing system capable of controlling a printing apparatus to print cover print data and body print data, the system comprising:
    an input unit configured to input print data by reading a document; a storage unit configured to store a plurality of print data;
    a selecting unit configured to select print data from among the plurality of print data stored in the storage unit;
    a first setting unit configured to set the print data input by the input unit or selected by the selecting unit, as the cover print data;
    a second setting unit configured to set the print data input by the input unit or selected by the selecting unit, as the body print data;
    a display unit configured to display the cover print data set by the first setting unit and a plurality of the body print data set by the second setting unit;
    a cancelling unit configured to cancel, in accordance with a user's instruction, the body print data from the plurality of print data displayed by the display unit;
    a control unit configured to control the printing apparatus to print the plurality of print data displayed by the display unit but not cancelled by the cancelling unit; and
    an inhibiting unit configured to inhibit the cancelling unit from cancelling the cover print data,
    wherein the printing system further comprises a processor.

2. The printing system according to claim 1, further comprising:
    a changing unit configured to change, in accordance with a user's instruction, print order of the body print data selected by the selecting unit,
    wherein the changing unit inhibits the change of print order of the cover print data.

3. The printing system according to claim 2, wherein the print order of the cover print data is the first.

4. The printing system according to claim 1, further comprising:
    a displaying unit configured to display information related to the print data selected by the selecting unit,
    wherein the display unit grays out information related to the cover print data.

5. A printing system capable of controlling a printing apparatus to print cover print data and body print data, the system comprising:
    an input unit configured to input print data by reading a document; a storage unit configured to store a plurality of print data;
    a selecting unit configured to select print data from among the plurality of print data stored in the storage unit;
    a first setting unit configured to set the print data input by the input unit or selected by the selecting unit, as the cover print data;
    a second setting unit configured to set the print data input by the input unit or selected by the selecting unit, as the body print data;
    a display unit configured to display the cover print data set by the first setting unit and a plurality of the body print data set by the second setting unit;
    a changing unit configured to change, in accordance with a user's instruction, print order of the body print data among the plurality of print data displayed by the display unit;
    a control unit configured to control the printing apparatus to print the plurality of print data displayed by the display unit in the print order changed by the changing unit; and
    an inhibiting unit configured to inhibit the changing unit from changing print order of the cover print data,
    wherein the printing system further comprises a processor.

6. The printing system according to claim 5, further comprising:
    a cancelling unit configured to cancel, in accordance with a user's instruction, the selection of the body print data by the selecting unit, wherein the cancelling unit inhibits the cancellation of the selection of the cover print data.

7. The printing system according to claim 5, wherein the print order of the cover print data is the first.

8. The printing system according to claim 5, further comprising:
a displaying unit configured to display information related to the print data selected by the selecting unit,
wherein the display unit grays out information related to the cover print data.

9. A printing method for controlling a printing apparatus to print cover print data and body print data, the printing method comprising:
inputting print data by reading a document; storing a plurality of print data in a storage unit;
selecting print data from among the plurality of print data stored in the storing step;
setting, in a first setting step, the print data input in the inputting step or selected in the selecting step, as the cover print data;
setting, in a second setting step, the print data input in the inputting step or selected in the selecting step, as the body print data;
displaying the cover print data set in the first setting step and a plurality of body print data set in the second setting step;
cancelling, in accordance with a user's instruction, the body print data from the plurality of print data displayed in the displaying step;
controlling the printing apparatus to print the plurality of print data displayed in the displaying step but not cancelled in the cancelling step; and
inhibiting cancelling of the cover print data in the cancelling step,
wherein the steps are executed by a processor.

10. A printing method capable of controlling a printing apparatus to print cover print data and body print data, the printing method comprising:
inputting print data by reading a document;
storing a plurality of print data in a storage unit; selecting print data from among the plurality of print data stored in the storing step;
setting, in a first setting step, the print data input in the inputting step or selected in the selecting step, as the cover print data;
setting, in a second setting step, the print data input in the inputting step or selected in the selecting step, as the body print data;
displaying the cover print data set in the first setting step and a plurality of body print data set in the second setting step;
changing, in accordance with a user's instruction, print order of the body print data among the plurality of print data displayed in the displaying step;
controlling the priming apparatus to print the plurality of print data displayed in the displaying step in the print order changed in the changing step; and
inhibiting changing of the print order of the cover print data in the changing step,
wherein the steps are executed by a processor.

11. A non-transitory computer-readable storage medium having stored thereon a computer program executable to perform a printing method for controlling a printing apparatus to print cover print data and body print data, the printing method comprising:
inputting print data by reading a document;
storing a plurality of print data in a storage unit;
selecting print data from among the plurality of print data stored in the storing step;
setting, in a first setting step, the print data input in the inputting step or selected in the selecting step, as the cover print data;
setting, in a second setting step, the print data input in the inputting step or selected in the selecting step, as the body print data;
displaying the cover print data set in the first setting step and a plurality of body print data set in the second setting step;
cancelling, in accordance with a user's instruction, the body print data from the plurality of print data displayed in the displaying step; and
controlling the printing apparatus to print the plurality of print data displayed in the displaying step but not cancelled in the cancelling step; and
inhibiting cancelling of the cover print data in the cancelling step.

12. A non-transitory computer-readable storage medium having stored thereon a computer program executable to perform a printing method capable of controlling a printing apparatus to print cover print data and body print data, the printing method comprising:
inputting print data by reading a document;
storing a plurality of print data in a storage unit;
selecting print data from among the plurality of print data stored in the storing step;
setting, in a first setting step, the print data input in the inputting step or selected in the selecting step, as the cover print data;
setting, in a second setting step, the print data input in the inputting step or selected in the selecting step, as the body print data;
displaying the cover print data set in the first setting step and a plurality of body print data set in the second setting step;
changing, in accordance with a user's instruction, print order of the body print data among the plurality of print data displayed in the displaying step; and
controlling the printing apparatus to print the plurality of print data displayed in the displaying step in the print order changed in the changing step; and
inhibiting changing of print order of the cover print data in the changing step.

13. A printing system capable of controlling a printing apparatus to print cover print data and body print data, the system comprising:
an input unit configured to input print data by reading a document;
a first setting unit configured to set the print data input by the input unit, as the cover print data;
a second setting unit configured to set the print data input by the input unit, as the body print data;
a display unit configured to display the cover print data set by the first setting unit and a plurality of the body print data set by the second setting unit;
a cancelling unit configured to cancel, in accordance with a user's instruction, the body print data from the plurality of print data displayed by the display unit;
a control unit configured to control the printing apparatus to print the plurality of print data displayed by the display unit but not cancelled by the cancelling unit; and,
an inhibiting unit configured to inhibit the cancelling unit from cancelling the cover print data,
wherein the printing system further comprises a processor.

14. A printing system capable of controlling a printing apparatus to print cover print data and body print data, the system comprising:
- a storage unit configured to store a plurality of print data;
- a selecting unit configured to select print data from among the plurality of print data stored in the storage unit;
- a first setting unit configured to set the print data selected by the selecting unit, as the cover print data;
- a second setting unit configured to set the print data selected by the selecting unit, as the body print data;
- a display unit configured to display the cover print data set by the first setting unit and a plurality of the body print data set by the second setting unit;
- a cancelling unit configured to cancel, in accordance with a user's instruction, the body print data from the plurality of print data displayed by the display unit;
- a control unit configured to control the printing apparatus to print the plurality of print data displayed by the display unit but not cancelled by the cancelling unit; and,
- an inhibiting unit configured to inhibit the cancelling unit from cancelling the cover print data,
- wherein the printing system further comprises a processor.

15. A printing system capable of controlling a priming apparatus to print cover print data and body print data, the system comprising:
- an input unit configured to input print data by reading a document; a first setting unit configured to set the print data input by the input unit, as the cover print data;
- a second setting unit configured to set the print data input by the input unit, as the body print data;
- a display unit configured to display the cover print data set by the first setting unit and a plurality of the body print data set by the second setting unit;
- a changing unit configured to change, in accordance with a user's instruction, print order of the body print data among the plurality of print data displayed by the display unit;
- a control unit configured to control the printing apparatus to print the plurality of print data displayed by the display unit in the print order changed by the changing unit; and
- an inhibiting unit configured to inhibit the changing unit from changing print order of the cover print data,
- wherein the printing system further comprises a processor.

16. A printing system capable of controlling a printing apparatus to print cover print data and body print data, the system comprising:
- a storage unit configured to store a plurality of print data;
- a selecting unit configured to select print data from among the plurality of print data stored in the storage unit;
- a first setting unit configured to set the print data selected by the selecting unit, as the cover print data;
- a second setting unit configured to set the print data selected by the selecting unit, as the body print data;
- a display unit configured to display the cover print data set by the first setting unit and a plurality of the body print data set by the second setting unit;
- a changing unit configured to change, in accordance with a user's instruction, print order of the body print data among the plurality of print data displayed by the display unit;
- a control unit configured to control the printing apparatus to print the plurality of print data displayed by the display unit in the print order changed by the changing unit; and
- an inhibiting unit configured to inhibit the changing unit from changing print order of the cover print data,
- wherein the printing system further comprises a processor.

\* \* \* \* \*